(12) United States Patent
Smart

(10) Patent No.: US 8,757,733 B2
(45) Date of Patent: Jun. 24, 2014

(54) OPTIMUM AERODYNAMIC BICYCLE WHEEL

(71) Applicant: Smart Aero Technology Limited, Brackley (GB)

(72) Inventor: Simon Smart, Brackley (GB)

(73) Assignee: ENVE Composites, LLC, Ogden, UT (US)

( * ) Notice: Subject to any disclaimer, the term of this patent is extended or adjusted under 35 U.S.C. 154(b) by 0 days.

(21) Appl. No.: 13/633,629

(22) Filed: Oct. 2, 2012

(65) Prior Publication Data

US 2013/0026815 A1 Jan. 31, 2013

Related U.S. Application Data

(63) Continuation of application No. PCT/GB2011/001648, filed on Nov. 25, 2011.

(60) Provisional application No. 61/417,278, filed on Nov. 25, 2010.

(51) Int. Cl.
*B60B 21/02* (2006.01)

(52) U.S. Cl.
USPC .................. 301/95.104; 301/95.102

(58) Field of Classification Search
USPC ............. 301/95.101–95.102, 95.104–95.106, 301/55, 58
See application file for complete search history.

(56) References Cited

U.S. PATENT DOCUMENTS

| | | | |
|---|---|---|---|
| 3,158,404 A | 11/1964 | Noakes | |
| 4,919,490 A | 4/1990 | Hopkins et al. | |
| 4,930,843 A | 6/1990 | Lewis | |
| 5,061,013 A | 10/1991 | Hed et al. | |
| 5,228,756 A | 7/1993 | Krampera | |
| 5,246,275 A | 9/1993 | Arredondo, Jr. | |
| 5,540,485 A | 7/1996 | Enders | |

(Continued)

FOREIGN PATENT DOCUMENTS

DE 101 32 090 A1 1/2003
EP 0 936 085 A2 8/1999

(Continued)

OTHER PUBLICATIONS

Chernyshenko, S. I. et al., "Trapped vortices and a favourable pressure gradient," J. Fluid Mech. (2003), pp. 235-255, vol. 482, Cambridge University Press (United Kingdom).

(Continued)

*Primary Examiner* — Jason Bellinger
(74) *Attorney, Agent, or Firm* — Woodard, Emhardt, Moriarty, McNett & Henry LLP

(57) ABSTRACT

Embodiments described herein improve airflow around the bicycle wheels by providing for one or more of: (1) a optimum leading edge width of a rim for preventing early stall in cross winds, while still allowing for sufficient stability without undue drag, while not unnecessarily increasing the rotating wheel and drag on the frame; (2) a sidewall shape with a subtle camber angle at the leading, which defines a rate of radius change at the max width of the rim—which further defines the max width and placement along the chord length for optimizing the aerodynamic properties of the rim; (3) a continuous rate of change of curvature at a spoke face, which fundamentally improves the performance and stability by generating a side force at higher yaw angles; and (4) wheel sets with a wider front rim relative to a narrower rear wheel to assist in flow attachment in high crosswind areas.

53 Claims, 15 Drawing Sheets

(56) References Cited

U.S. PATENT DOCUMENTS

| | | |
|---|---|---|
| D378,506 S | 3/1997 | Stolz et al. |
| 5,893,614 A | 4/1999 | Dennis |
| 5,915,796 A | 6/1999 | Beyer |
| 5,975,645 A | 11/1999 | Sargent |
| 6,086,161 A | 7/2000 | Luttgeharm et al. |
| 6,193,322 B1 | 2/2001 | Corridori |
| 6,991,298 B2 | 1/2006 | Ording et al. |
| 7,114,785 B2 | 10/2006 | Ording et al. |
| 2007/0200422 A1 | 8/2007 | Davis et al. |
| 2009/0236902 A1 | 9/2009 | Zibkoff |
| 2010/0225090 A1 | 9/2010 | Cusack et al. |

FOREIGN PATENT DOCUMENTS

| | | |
|---|---|---|
| EP | 1 134 096 A2 | 9/2001 |
| EP | 1 404 534 B1 | 6/2002 |
| EP | 2 100 751 A1 | 9/2009 |
| WO | WO 03/004290 A1 | 1/2003 |

OTHER PUBLICATIONS

Harder, Paul et al., "Airfoil Development for the Trek Speed Concept Triathlon Bicycle", Apr. 24, 2010.

International Patent Application PCT/GB2011/001648 International Search Report and Written Opinion mailed Jun. 25, 2012.

International Patent Application PCT/GB2011/001648 Partial International Search Report mailed Mar. 22, 2012.

Iollo, Angelo et al., "Trapped vortex optimal control by suction and blowing at the wall," Eur. J. Mech. B—Fluids (2001), pp. 7-24, Editions scientifiques et medicales Elsevier SAS.

(Prior Art)
Cross-section of Rim with
Discontinuous Rate of
Change of Curvature

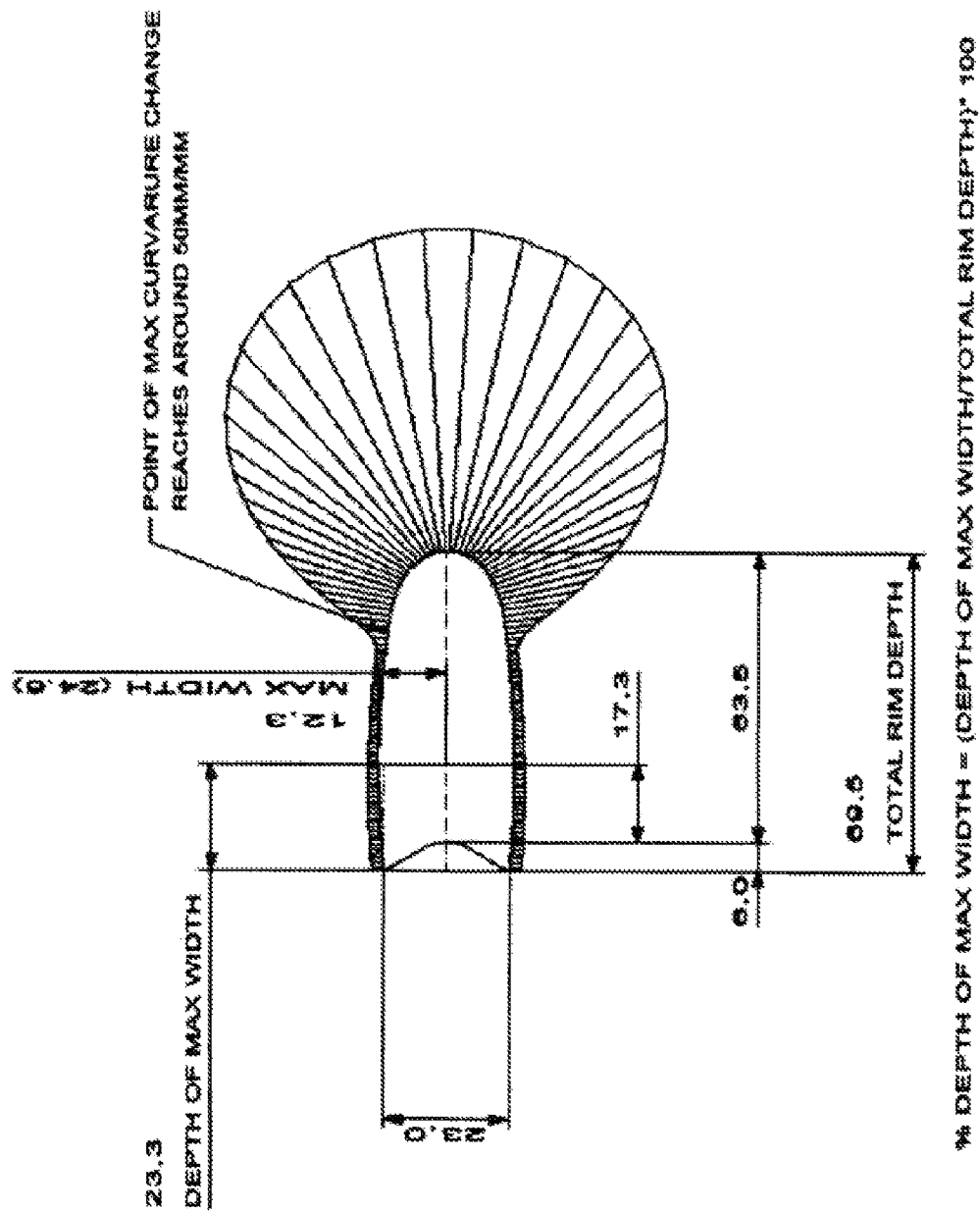

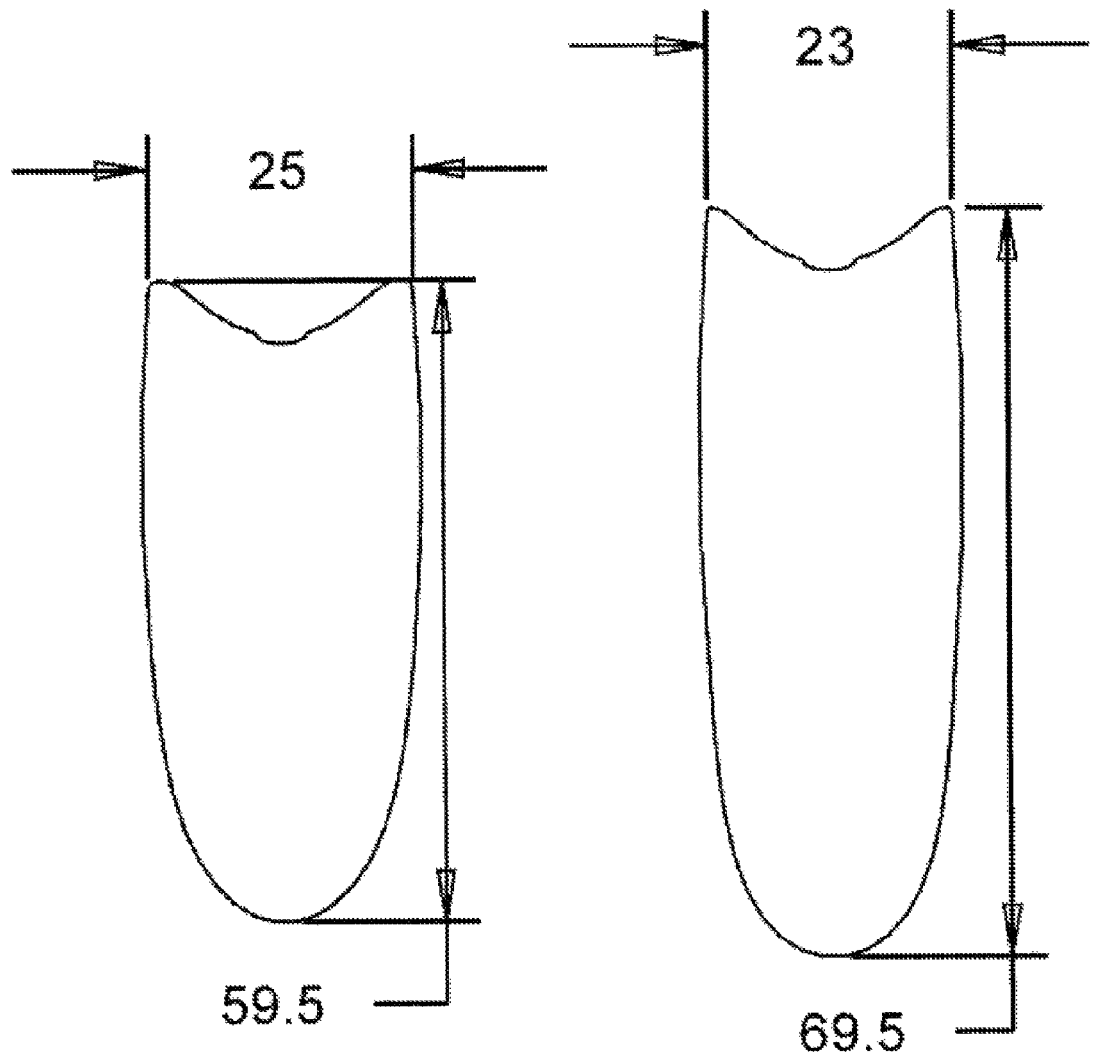

OPTIMUM AERODYNAMIC BICYCLE WHEEL

CROSS-REFERENCE TO RELATED APPLICATIONS

This application is a continuation of International Patent Application No. PCT/GB2011/001648, filed Nov. 25, 2011, which claims the benefit of U.S. Provisional Patent Application No. 61/417,278 filed Nov. 25, 2010, which are hereby incorporated by reference.

BACKGROUND

Most everyone experiences the joy of riding a bicycle at one point in their lifetime, and many learn to ride at a very young age. Because a young child can master its basic principles, the act of riding a bicycle itself appears very simple. The physics behind the exhilarating ride, however, are anything but simplistic. The cyclist needs to overcome numerous types of forces acting on the properties of balancing, steering, braking, accelerating, suspension activation, vibration, and many other bicycling characteristics. Moreover, many of the forces in each physical realm are open to change and depend on their surrounding environment and/or forces from other properties, which adds several orders of complexity.

To consider the complexities of a bicycle as a whole becomes somewhat overwhelming. Separately evaluating each force, however, that acts on the various properties of a bicycle ride makes the task somewhat manageable. For example, if we consider a cyclist or rider and her bicycle as a single system, two groups of forces emerge that act on that system and its components: internal and external forces. Internal forces are mostly caused by the rider and the rider's interaction with the bicycle (e.g., by bicycle component friction). External forces, on the other hand, are due to gravity, inertia, contact with the ground, and contact with the atmosphere.

While the internal forces can have a significant impact on bicycle performance, most any bicycle racer will agree that the largest resistance comes from the induced external force of the bicycle's movement through the air. As a rider attempts to move faster, the atmospheric drag and crosswind forces become greater, which in turn requires the rider to expend greater energy to overcome them. Thus, these forces become an important consideration in bicycle designs, especially in the areas of bicycle racing and triathlons.

Traditionally, bicycle structures such as frames, seat tubes, fork blades, shift levers, etc. have generally circular or otherwise generally uniform smooth curvilinear cross-sectional shapes. Such structures have cross sections with relatively low length-to-width aspect ratios. As used herein, the aspect ratio of a cross section is defined as the unit length over the unit width wherein the length is oriented to be generally aligned with a direction of travel of the bicycle structure. For example, a bicycle structure having a cross section with a circular shape has an aspect ratio of approximately 1. During cycling, bicycle structures having aspect ratios of approximately 1 experience airflow detachment about a portion of the perimeter of the cross section of the bicycle structure. The airflow detachment creates a swirling and often turbulent region of airflow in a wake region generally immediately behind the respective bicycle tube. The wake in the airflow is indicative of energy dissipation and relatively high levels of drag associated with the bicycle structures, and thus, the bicycle.

In an effort to reduce the external drag forces associated with airflow operation of the bicycle, manufactures now design and construct bicycle structures with improved aerodynamic characteristics. One such widely accepted solution has been to provide the bicycle structure in an airfoil shape, which are most often associated with airplane wings, automobile spoilers, marine parts (commonly referred to as hydrofoils or hydrofins), and other aerodynamic systems.

Regardless of the specific application of the airfoil-shaped structure, the cross sections of airfoils generally have lengths that are several times greater than their widths. A forward facing portion of the airfoil, or the leading edge, is generally curved, although other shapes are possible, and configured to be oriented in a forward facing direction relative to an intended direction of travel. Generally, oppositely facing sidewalls extend rearward from the leading edge and converge at a trailing edge of the cross section of the airfoil.

The trailing edge forms the termination of the airfoil and is typically adjacent a narrowed, pointed tail section of the airfoil. A chord that extends between the leading edge and trailing edge of the cross section is indicative of the airfoil length and is generally many times longer than the longest chord extending between the oppositely facing sidewalls of the cross section. Chords that extend between the widest sections of adjacent sidewalls of the airfoil are indicative of the width of the airfoil. Providing an airfoil having a length that is greater than the width yields an airfoil having a cross section with an aspect ratio that is generally many times larger than a value of 1.

The higher aspect ratio allows the airflow directed over the airfoil to conform to the shape of the airfoil and reduces the potential that the airflow will detach from the walls of the bicycle structures (as compared to bicycle structures that have lower aspect ratios or ratios nearer to 1). Similarly, the increased aspect ratio reduces the size of the turbulent wake region that generally forms immediately behind the bicycle structure; thus, reducing the overall external drags of the bicycle or system. Although such airfoil shapes provide reduced drag performance as compared to structures having lower aspect ratios, such shapes are not without their respective drawbacks or limitations.

For example, international bicycle racing regulations limit the permissible cross sections for bicycle frame tubes. These regulations define a maximum length and a minimum width of the shape of the cross section and thereby effectively define a maximum allowable aspect ratio. For many experienced riders, this maximum allowable aspect ratio is far less than ideal for reducing the amount of drag experienced by a rider. That is, many experienced rider's prefer bicycles with enhanced aspect ratios beyond the regulated limits; however, if they wish to engage in many racing events, they must adhere to the imposed limitations. Thus, while airfoil-shaped bicycle structures experience lower levels of drag as compared to traditional blunt cross sections, e.g., circular, the regulated airfoil-shaped tubes cannot realize the aerodynamic improvements possible with airfoils having higher aspect ratios.

In addition to the regulated performance considerations above, practical considerations also limit the attainable aspect ratios of bicycle structures. For example, as the length of the cross section increases and the width of the cross section decreases with increased aspect ratios, the strength and/or lateral stiffness of the bicycle structure decreases. In other words, the elongated shape of the cross section that improves airflow also detracts from the lateral strength of the bicycle structure. Although attempts to resolve this relationship yielded frame assemblies with improved lateral strength performance, they often inherit increased weight that nearly offset the benefits achieved with the improved aerodynamic performance. Accordingly, there exists a fine balance between the structural integrity and the weight of the bicycle frame when altering the shape of the cross section to achieve a desired aspect ratio.

Another shortcoming of many known airfoil constructions is the difficulty associated with forming the tapered tail section of the airfoil shape. The tail of a common airfoil-shaped structure is relatively narrow and gradually transitions to the generally pointed trailing edge of the airfoil. Forming a blemish free pointed tail section is fairly difficult to manufacture and can be particularly problematic in the composite molding processes that are commonly utilized for manufacturing bicycle structures such as frames, frame tubes, fork tubes, and the like. Simply, it is difficult to maintain the desired shape of the frame tube sections with the materials and processes common to current bicycle frame construction.

Accordingly, there exists a need for a bicycle structures with improved aerodynamic performance that do not overly detract from the lateral strength of the system and preferably comply with international bicycle racing regulations.

BRIEF SUMMARY

Example embodiments of the present invention overcome the above-identified deficiencies and drawbacks of current bicycle structures. For example, embodiments described herein optimize the airfoil shapes of bicycle components (most notably in the bicycle wheels), which provide for overall enhanced performance yet remain rigid, durable, and in compliance with international racing standards. More specifically, example embodiments improve airflow around the bicycle wheels by providing for one or more of: (1) an optimum leading edge width of a rim for preventing early stall in cross winds, while still allowing for sufficient stability without undue drag; (2) a sidewall shape with a subtle camber angle at the leading edge, which defines a rate of radius change at the maximum width of the rim; (3) based on the optimum leading edge and subtle camber angle, another embodiment further defines the max width and placement along the cord length for optimizing the aerodynamic properties of the rim; (4) a continuous, evenly distributed, uniform, and/or gradual rate of change of curvature at a spoke face, which fundamentally improves the performance and stability by generating a side force at higher yaw angles; (5) a virtual double leading edge airfoil rim, which combines the tire as a leading edge of the rim with a large spoke hole face radius at a trailing edge, thereby providing optimum airflow in both directions; (6) a rim that both minimizes the rate of change of curvature and maximizes the spoke hole radius to a level which produces a balanced side force of airflow in each flow direction, thus virtually eliminating cross wind effects; (7) an overall combined geometric shape of a rim that produces optimal airflow and attachment, through the combining of the aforementioned features into a single rim; and (8) wheel sets with differing front rims relative to a rear rim for assisting in overall flow attachment and minimal drag around and on the bicycle and in high crosswind areas. Note that this Summary simply introduces a selection of concepts in a simplified form that are further described below in the Detailed Description. Accordingly, this Summary does not necessarily identify key features or essential aspects of the claimed subject matter and is not intended to be used as an aid in determining the scope of the claimed subject matter.

Additional features and advantages of the invention will be set forth in the description which follows, and in part will be obvious from the description or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 10A and 10B illustrate many optimum features of a cross section for a 70 millimeter (mm) depth rim and the continuous rate of change of curvature achieved from such optimization in accordance with exemplary embodiments described herein;

FIG. 15 is a cross-sectional view of a 60 millimeter depth rim described in Table 3;

FIG. 16 is a cross-sectional view of a 70 millimeter depth rim described in Table 3;

DETAILED DESCRIPTION

Figure 1:
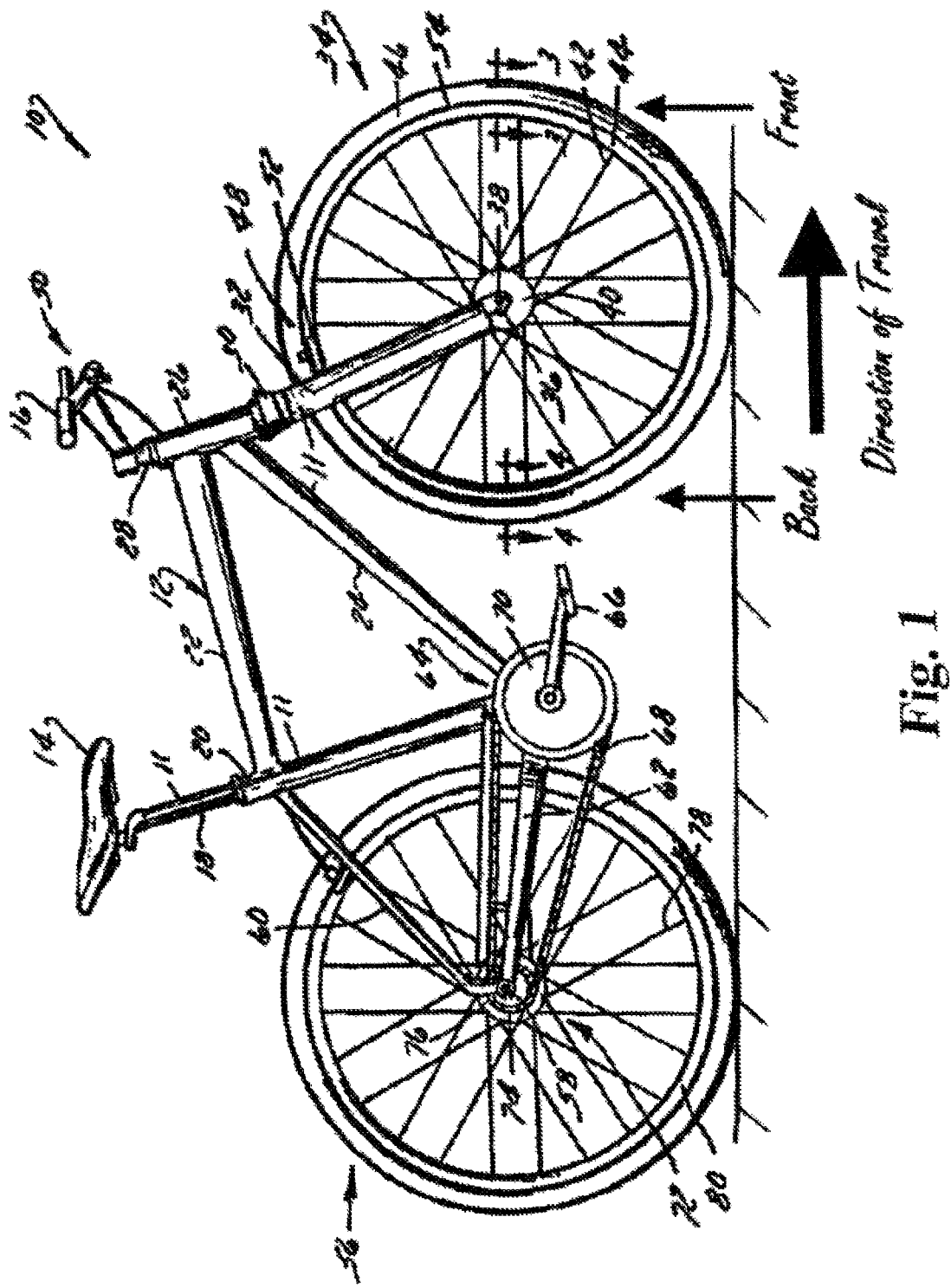
FIG. 1 is an overall view of a typical bicycle with associated components and structures that can benefit from one or more improvements of the present invention.

The present invention extends to methods, systems, and devices for optimal drag reduction of bicycle wheels caused by crosswind and other external factors. For example, one embodiment limits the leading edge width of the rim for optimal aerodynamics around the bicycle, while having sufficient width to limit stall. Similarly, other embodiments reduce the overall drag of bicycle wheels by optimizing the sidewall shape with a subtle camber angle for preventing sidewall detachment and turbulence and maintain optimum airflow over a wide series of yaw angles. Still other embodiments provide for a spoke face for a rim with a continuous, evenly distributed, uniform, and/or gradual rate of change of curvature (i.e., no sudden steps or changes in surface area angles especially around or near the trailing edge of the rim) for improving overall stability and performance by generating a side force at higher yaw angles (i.e., when the flow is in the opposite direction on the back of the rim or wheel). Another embodiment provides for a virtual double leading edge airfoil rim for optimizing airflow in all directions by combining the tire as a leading edge of the wheel with a large spoke hole face radius at the trailing edge—which becomes the leading edge from the backflow side of the rim or wheel. Thus, the wheel or rim becomes balanced because the side forces on the front and rear of the rim or wheel are tuned to balance each other to reduce or eliminate any turning moment generation. Still yet, another embodiment improves the overall aerodynamics of the bicycle system by defining wheel sets with differing front and rear wheels shapes and sizes for assisting in overall flow attachment and minimal drag around and on the bicycle and in high cross wind areas.

Prior to describing the above advantageous features of the present invention in detail, the following few sections generally describe term definitions for use in understanding various embodiments of the present invention. In addition, some of the following diagrams describe in general various aspects, properties, or features of current bicycle structures and systems that may utilize many of the advantageous realized by the present invention, as described in detail subsequent thereto.

Definitions

Airfoil: the two dimensional cross section of a bicycle tube, which typically represents a streamlined aerodynamic shape defined in the waterline plane.

Aspect Ratio: The ratio of the major chord (length or total rim depth) to the minor chord (max width) of a two-dimensional airfoil.

Boundary Layer: the layer of slower-moving fluid immediately next to the airfoil wall.

CFD: Computational Fluid Dynamics or computer software that simulates fluid flows and can be used to predict aerodynamics.

Camber Angle (Sidewall): as used herein refers to the angle between the sidewall of a rim and a hypothetical perpendicular line adjacent thereto.

End-effects: the flow across the end of a finite-length airfoil section which generally increases drag and reduces lift.

Leading Edge (LE) of a Rim: is one of two edges of the rim that holds the sidewall of the tire and forms part of the wheel bed securing the tire to the rim. Such edge may take the form of a flange in the case of traditional "clincher" type wheels or may take the shape of a shallow lip that forms a cusp where the tire lies for tubular or sew-up rims. Note that this can also refer to the distance between the tire bed and the tip of the leading edge (measured in mm) depending on the use thereof.

Leading Edge Width: is the inner width between the two leading edges at the very tip thereof or the furthest point forward on the tire bead or edge.

LE Sidewall: is related to the leading edge and defines where the sidewall begins relative to the leading edge. While the sidewall generally has a large gradual curvature, the rim within a few min at the leading edge has a radius that is much smaller.

LE Sidewall Width: defines the width of the rim at the LE Sidewall, which is generally at the wheel bed where the tire or tube sits within the rim sidewalls.

Max Width: refers to the maximum width of the rim, which typically exceeds the LE Sidewall width and occurs some distance along the chord of the rim measured from the leading edge (i.e., considering the total rim depth), which can further be defined by a camber angle described above and hereinafter.

Pitch: the vertical angle of tilt of a component, e.g., a down tube has a nearly 45 degree pitch.

Rate of Change of Curvature or Gradient: defines the difference in curvature or radius change over a given surface per curvilinear millimeter (mm). In particular, a radius of curvature, R, of a curve at a point is a measure of the radius of the circular arc which best approximates the curve at that point. It should be recognized that at any intersection point along a curve of a two-dimensional cross-section, a line can be drawn that is tangent to the curve. The radius of curvature (R) at the point is then measured perpendicular to the tangency line. From the radius of curvature (R), the curvature (K) can be expressed using Equation 1 below, which in its simplest form it can be considered as the inverse of the radius of a circle.

$$K = \frac{1}{R} \qquad \text{Equation 1}$$

where:
K=Curvature
R=Radius of Curvature

The rate of change of curvature (or gradient) simply is a ratio of the change in curvature between two measurement points ($P_1$, $P_2$) and the curvilinear or travelling distance (L) between the two points ($P_1$, $P_2$). The rate of change of curvature or gradient ($\partial K$) can be represented by equation 2 below.

$$\partial K = \frac{(K_2 - K_1)}{L} \qquad \text{Equation 2}$$

where:
$\partial K$=Rate of change of curvature or gradient
$K_1$=Curvature at measurement point $P_1$
$K_2$=Curvature at measurement point $P_2$ L=Curvilinear or travelling distance between points $P_1$ and $P_2$.

Rim: generally, the outer portion of a wheel assembly that holds the tire (which represents the leading edge of an airfoil shape of the rim) on the outer surface and spokes through spoke holes of an inner surface (which then becomes the trailing edge of the airfoil shape). Note that embodiments described herein may refer to either the wheel or rim, and thus the terms become interchangeable herein; however, when used in a claim the term "rim" does not include the tire, spokes, and or hub assembly unless otherwise claimed.

Spoke Face: the surface of the rim where a spoke of a wheel extends for attachment to the hub. Note that if referred to as a distance, it represents the radial distance extending from the chord of the rim toward the LE Sidewall to a point where the rate of change of curvature dramatically increases—which generally starts on one sidewall at about ⅔ the total rim depth measured from the LE and continues to the same point on the opposite sidewall.

Traditional Airfoil: a teardrop-like shape with a pointed or generally tapered tail.

Toroid or toroidal: means a surface generated by a plane closed curve rotated about a line that lies in the same plane as the curve but does not intersect it and generally represents the airfoil shape of many bicycle component designs in accordance with exemplary embodiments.

Waterline: a plane parallel with the ground which slices through a bicycle tube (much like surface of water if the tube were partially submerged) and represents the direction of air travel; thus, determining the effective airfoil that the air sees.

Wheel: generally herein, a wheel includes the outer circular rim that holds the tire along with the spoke and hub assembly; however, based on the embodiment described, a wheel and rim may be used herein interchangeably.

Yaw: the angle between the total airspeed vector and the direction of bicycle motion.

General Description of Bicycle Components

FIG. 1 shows a bicycle 1 having a number of bicycle structures 11 constructed according to example embodiments of the present invention. As described further below, it is envisioned that bicycle structures 11 can include a bicycle frame, tube, a fork blade, a wheel, a tire, a handlebar, a handlebar stem, a seat post, a pedal crank arm, a dropout a shift lever, a cable guide, a cable, a bicycle accessory such as a water bottle, and/or a bicycle accessory holder constructed according to exemplary embodiments of the present invention.

Bicycle 10 includes a frame 12 that supports a rider and forward and rearward wheel assemblies. Bicycle 10 includes a seat 14 and handlebars 16 that are attached to frame 12. A seat post 18 is connected to seat 14 and slidably engages a seat tube 20 of frame 12. A top tube 22 and a down tube 24 extend forwardly from seat tube 20 to a head tube 26 of frame 12. Handlebars 16 are connected to a stem 28 that passes through head tube 26 and engages a fork crown 30. A pair of forks 32 extend from generally opposite ends of fork crown 30 and are constructed to support a front wheel assembly 34 at an end or fork tip 36 of each fork 32. Fork tips 36 engage generally opposite sides of an axle 38 that is constructed to engage a hub 40 of front wheel assembly 34. A number of spokes 42 extend from hub 40 to a rim 44 of front wheel assembly 34. A tire 46 is engaged with rim 44 such that rotation of tire 46, relative to forks 32, rotates rim 44 and hub 40.

Bicycle 10 includes a front brake assembly 48 having an actuator 50 attached to handlebars 16 and a pair of brake pads 52 positioned on generally opposite sides of front wheel assembly 34. Brake pads 52 are constructed to engage a brake wall 54 of rim 44 thereby providing a stopping or slowing force to front wheel assembly 34. Alternatively, a disc brake assembly including a rotor and caliper may be positioned proximate hub 40 of front wheel assembly 34. Such assemblies are readily understood in the art. Understandably, one or both of front wheel assembly 34 and a rear wheel assembly 56 of bicycle 10 could be equipped with rim-based or disc-based braking systems.

Similar to front wheel assembly 34, rear wheel assembly 56 is positioned generally concentrically about a rear axle 58 such that rear wheel assembly 56 rotates about rear axle 58. A seat stay 60 and a chain stay 62 offset rear axle 58 from a crankset 64. Crankset 64 includes a pedal 66 that is operably connected to a chain 68 via a chain ring or sprocket 70. Rotation of chain 68 communicates a drive force to a rear section 72 of bicycle 10 having a gear cluster 74 positioned thereat. Gear cluster 74 is generally concentrically orientated with respect to rear axle 58 and includes a number of variable diameter gears. Understandably, sprocket 70 could also be provided with a number of variable diameter gears thereby enhancing the gearing ratios that can be attained with bicycle 10.

Gear cluster 74 is operationally connected to a hub 76 of rear wheel assembly 56. Rear wheel assembly 56 includes hub 76, a number of spokes 78, and a rim 80. Each of the number of spokes 78 extend between hub 76 and rim 80 and communicate the loading forces in-between. As is commonly understood, rider operation of pedals 66 drives chain 68 thereby driving rear wheel assembly 56 which in turn propels bicycle 10. Front wheel assembly 34 and rear wheel assembly 56 are constructed such that spokes 42, 78 communicate the forces associated with the loading and operation of bicycle 10 between hubs 40, 76 and rims 44, 80, respectively. It is appreciated that bicycle 10 could form a mountain or off road bicycle or a road bicycle, or a bicycle configured for operation on paved terrain. Although more applicable to bicycles that commonly attain greater operating speeds, it is envisioned that a variety of bicycle configurations may benefit equally from the present invention.

As explained in greater detail below, example embodiments provide for a bi-directional airfoil rim. In order to understand such embodiment, FIG. 1 illustrates a waterline cross-sections of wheel 34 represented by intersecting lines 3-3 and 4-4. Provided the direction of travel as shown, a rim 44 has a front or forward facing section represented by the waterline cross-section 3-3, and a backward or reverse airflow section along the waterline cross-section 4-4. As such, tire 46 acts as a leading edge for a first airfoil, while a spoke face for rim 44 represents the trailing edge, in the forward direction of travel. When rotated 180°, the spoke face for the rim 44 now becomes a leading edge and the tire acts as the trailing edge of airflow around the back of the wheel 34 or reverse airflow direction.

Note that conventional rims only consider the airfoil shape in the forward direction or at the front of the rim. As such, the design of a aerodynamic rim 44 typically resembles a airplane wing shape when combined with the tire, i.e., with a larger radius leading edge of the tire 46 and a thin tapered trailing edge represented by a narrow radius or pointed spoke face (usually limited by the spoke 42 diameter and its 42 securing mechanism to the rim 44). In other words, up until the present invention, conventional wisdom designed rims 44 for aerodynamic efficiency by creating as near of teardrop shape as possible, constrained only by the limitations of the spokes 42. Such design, however, only considered the forward direction of airflow around the rim and ignored the reverse direction or backside of the wheel.

As described in greater detail below, example embodiments of the present invention expel the notion of conventional airfoil shapes by creating a bi-direction airfoil with virtually dual optimum leading edges. More specifically, example embodiments provide for a first leading edge of an airfoil as before, i.e., represented by a tire 46 attached to the rim 44. Unlike traditional spoke face designs, however, embodiments described herein provide for a large radius spoke face with a gradual, uniform change in radius extending from the sidewalls of the rim to the center for the spoke hole face. Such large radius spoke face in the reverse direction forms a second leading edge in the rearward direction of airflow on the rim; thus forming a optimum bi-directional airfoil rim with virtually two reversible leading edges.

Wheel Description and Optimum Camber Angle Defined

Figure 2:
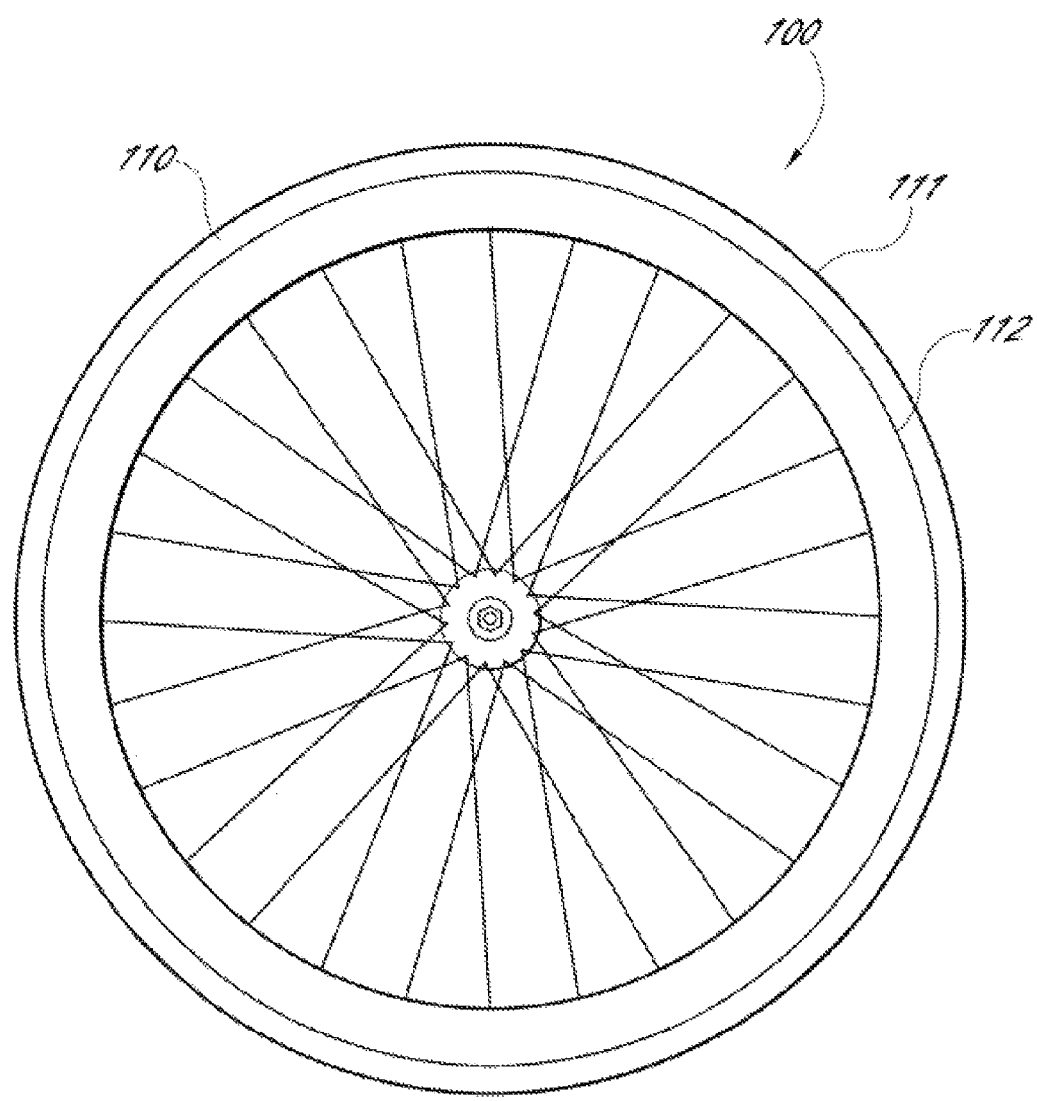
FIG. 2 is a side view of a wheel that may employ various embodiments of the present invention.
Figure 3:
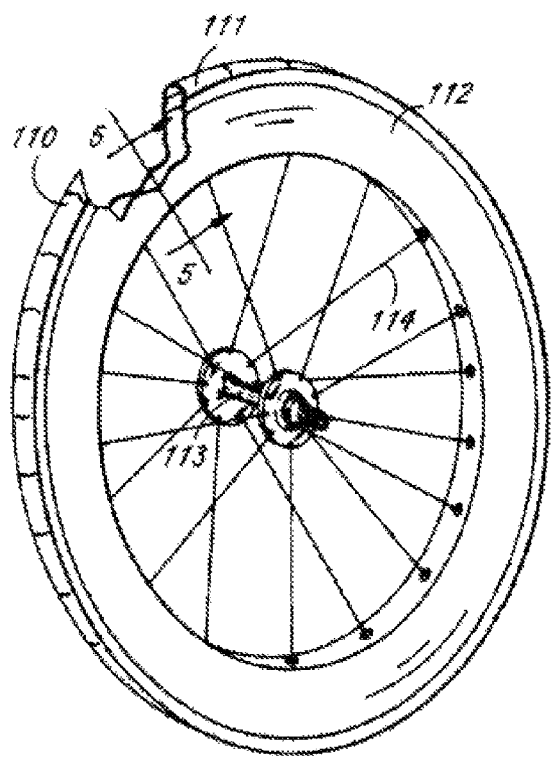
FIG. 3 is a perspective view of the wheel in FIG. 2.

FIGS. 2-5 illustrate a general wheel assembly 100 for the bicycle 10 in FIG. 1 and cross-sectional views of a tubeless (FIG. 4) and clincher (FIG. 5) rims capable of being optimized by various embodiments herein described below. Referring to FIGS. 2 and 3, a bicycle wheel 100 is depicted showing a tire mounted thereto 110. The wheel 100 may include a pair of planar-ring, parallel, and opposing brake surfaces, such as surface 111. Wheel 100 also includes convex curved carbon body sidewalls 112 that make up part of the rim, a center hub 113, and a plurality of spokes 114.

Figure 4:
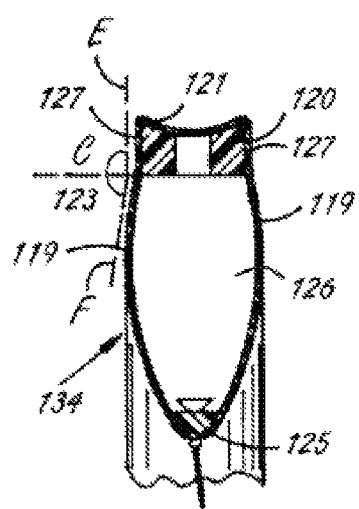
FIG. 4 is a cross section of the wheel depicted in FIGS. 2 and 3 in the plane defined by lines 5-5 in FIG. 3, which shows a cross-sectional view of a tubular type rim and also defines a camber angle that may employ various embodiments of the present invention.

In FIG. 4, a cross section (taken from the line formed by the intersection 5-5 in FIG. 3) of wheel 100 is shown which is molded to be a one-piece wheel wherein the rim portion and body portion are made from similar materials, in contrast to some two-piece wheels described below. The wheel of FIG. 4 has a tire mounting surface 121, a pair of straight and parallel braking surfaces 127, and a filled area of core material 120. The body portion extends from the braking surfaces 127 and includes sidewalls 119, and a hollow interior 126. The bulbous carbon body portion 134 typically includes a reinforced inner diameter portion having spoke attachment points which are typically apertures and which may include a metallic insert 125 for serving as an anchor for the spoke.

An acute angle 123 is formed between the braking surface 127 and the flexible sidewalls 119 and a line generally parallel to the axis of the rim (see angle 123 and horizontal line drawn between the braking surface 127 and the sidewall 119 of FIG. 4). Viewed another way, a radially extending line "E" that is disposed in the plane of the braking surface(s) 127 would intersect a radially extending line "F" that is disposed tangentially to the sidewall(s) 119 of the body portion, at an axially outwardly facing intersection angle "C", which is referred herein as the camber angle. As described, for example, in U.S. Pat. No. 5,975,645 to Sargent entitled "Carbon Bodied Bicycle Rim", a typical such camber angle has been less than 175° and preferably less than 165°. Example embodiments of the present invention, however, define the camber angle to be greater than 175°, but should be less than 178° (preferably between about 177.5° and 177.8°) for improved performance.

Figure 5:
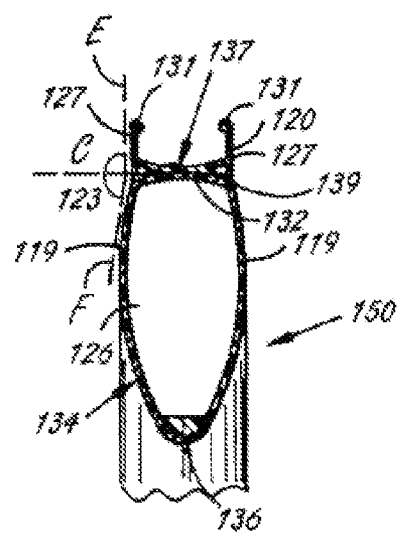
FIG. 5 is a transverse cross section as formed by lines 5-5 in FIGS. 2 and 3, showing an alternate clincher rim that can also utilize various embodiments of the present invention.

Note that the same or similar dimensional aspects apply to the clincher rim shown in FIG. 5 for defining the camber angle described above in FIG. 4. For example, shown in FIG. 4, a carbon body portion 134 includes a sidewall portions 119 extending from the radially outermost parts 139 where the sidewalls 119 intersects with the braking surfaces 127, past the point of maximum width, and terminates at the radially innermost point 136, which is shown as being thicker than the sidewall 119, and thereby being reinforced. The axially extending, radially outwardly facing rim engaging surface 132, may include a circumferential crown portion and an interior 126 hollow portion to facilitate flex of the sidewalls.

Similar to FIG. 4, a camber angle "C" is defined by a radially extending line "E" that is disposed in the plane of the braking surface 127 intersects a radially extending line "F" that is disposed tangentially to the sidewall 119 of the body portion 150 at an axially outwardly facing intersection angle "C". Again, camber angle "C" should be less than 178°, but greater than 175° (and preferably between 177.5° and 177.8°) for improved performance as described in greater detail below with regard to FIG. 12. An acute angle 123 may be formed between a line A perpendicular to the braking surface 138 and the first flexible sidewall 152 (see angle 123 and line horizontal line drawn between braking surface 127 and sidewall 119 of FIG. 5).

As will be described in greater detail below, the above camber angle may be more accurately defined and represented using another example embodiment of tangency angles. More specifically, referring to FIG. 10B, leading edge (LE) and trailing edge (TE) tangency angles may be used as described herein after for determining the optimum airfoil design (especially for a bi-directional or virtual dual LE airfoil).

Optimal Leading Edge and Max Width

As noted above, the Applicant realized an optimum leading edge width for preventing a rim from stalling early in a crosswind, while maintaining stability without unnecessary drag. More specifically, it was determined that a rim with a leading edge width less than about 23 mm causes a wheel to stall early in a crosswind, which greatly increases the drag at earlier yaw angles and exposes extremely adverse properties of instability and loss of control. Although a wider rim allows for better stability in a crosswind, and most rims today include a leading edge of greater than 27 mm, beyond a certain point there becomes diminishing returns based on an increase in drag from the wider rim itself. In other words, Applicant found that at widths beyond about 27 mm, the overall drag (especially the rotating drag associated with a wider rim) increase did not compensate for the later stall savings. In short, example embodiments provide for an optimal width of about 23 to 27 mm at the leading edge of a rim (more preferably between 24-26 mm), which prevents an early stall in crosswinds while still allowing suitable stability without unnecessary drag from other external forces acting on larger width wheels.

In short, increased width relative to the tire improves flow attachment on the rim at the front of the wheel, and generally when significantly wider than the tire, flow attachment can be achieved. Nevertheless, there remains a limit on the front wheel of the bicycle due to the system drag (bicycle and wheel) becoming worse. Accordingly, example embodiments limit the width at the leading edge (and the max width) based on the desired shape at the trailing edge of the rim (i.e., the spoke hole face).

With the camber angle previously optimized at between about 175° and 178°, and with the optimum width at the leading edge defined in the rage of 24 to 26 mm, the Applicant then determined a max width for the airfoil at an optimum location along the chord. Looking at FIGS. 6B and 6D, it was found that the maximum width depth D where the maximum width B should be optimally located at approximately 40% or less of the total rim depth (as measured from the leading edge to the spoke face surface), and more specifically, at approximately 30% or less of the total rim depth. More specifically, the Applicant found that wheels with large constants or gradually changing radius with a slightly wider section at approximately 40% or less of the total rim depth allowed for significant increases in yaw angles relative to the overall drag. For example, when the difference in width between the leading edge and the maximum width (which is located at chord percentage of less than 30%) is approximately 0.75 mm, the overall surface separation of airflow along the sidewalls of the rim is dramatically reduced. This also allows higher yaw angles without stalling in crosswinds. In fact, as will be shown below with reference to FIG. 9, this and other embodiments described herein result in a rim capable of achieving a very rare phenomenon known as negative drag at specified yaw angles.

Figure 12A:
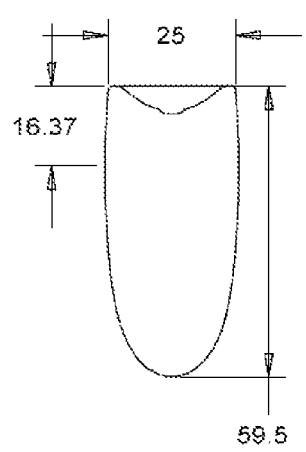
FIGS. 12A, 12B, and 12C illustrate the leading edge width and placement of maximum width as a percentage of the rim depth along the cord in accordance with exemplary embodiments of the present invention.
Figure 12B:
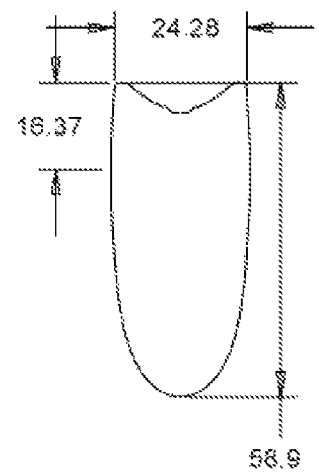
Figure 12C:
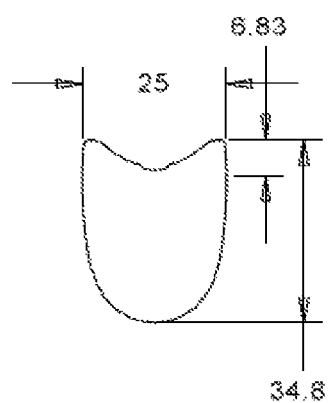

Referring to FIGS. 12A, 12B, and 12C, rim profiles for three different rims (two 60 and one 35 mm) and styles are shown. In accordance with example embodiments, generally speaking, the rim width preferably remains between about 24 mm and 26 mm, and even more preferably at about 25 mm. As also shown in the example rim profiles, a maximum width is set at a value less than 40% and more specifically less than 30% of the overall depth. Note that these examples give specific measurements for the various rim depths they represent; however, example embodiments are not limited to such specific measurements. In fact, as described throughout the application, there are a myriad of shapes and combination of rim sizes capable of taking advantage of the exemplary embodiments described herein. As such, any specific reference to dimensions of any particular size wheel and/or rim are used herein for illustrative purposes only do not limit or otherwise narrow the scope of the present invention unless otherwise explicitly claimed.

Also note that in this example, there are two different profiles for the 60 mm rim: one for the "front" rim and one for the "rear." As noted above, the front rim's airflow is based on the width of the leading edge and the interaction of flow around the front fork. The rear wheel, on the other hand, performs differently due to shielding from the frame and the fact that width induces an even greater amount of drag on the frame. Accordingly, example embodiments provide for a rim set or system configured to reduce the overall drag or optimize the overall airflow of a bicycle by defining differing size and/or shape front and rear wheels. More specifically, example embodiments provide for a narrower rear wheel to reduce frame induced drag. Because of the partially shielded flow around the rear wheel by the seat post, the airflow does not interact with the tire in the same way that it does with the front. Therefore, the spoke face becomes the more dominant feature on the rear wheels since airflow interacts more on the back edge of the rear rim than on its front. Thus, as described below, embodiments do not focus on the leading edge width or max width of the rear rim as much as the preferred wide radius spoke hole face for ensuring an rim airfoil of bi-directional capabilities.

Similarly, other embodiments provide for a shallower front rim than the rear since a deeper rim generates less drag, but due to side force issues there becomes a limit to stability through the steering. In other words, example embodiments provide for the optimum rim set of a wider, shallower front rim and a deeper, narrower rear set up. Note, however, that the application also contemplates any sub combination of the differences and optimization. For example, as described below, the overall shape of the rims may also differ; and thus, the use of the difference in the rim sets based on the width and depth is used herein for illustrative purposes only and does not limit the claims unless otherwise explicitly stated.

Spoke Face and Rim Shape

Other example embodiments described herein provide for fundamental improvements in performance and stability through a wheel or rim spoke face with a curvature radius as large as possible, but with a lowest possible rate of change of curvature (i.e., continuous curvature). This unusual design feature differs significantly from prior art designs that include sudden step changes in curvature rate along the spoke face. More specifically, as previously mentioned, airfoils generally take the form of a teardrop shape with the sidewalls converging into a relatively sharp point. In the case of wheel designs, however, such sharp point needed moderate flattening in order to accept spoke holes and for ease in manufacturing. Nevertheless, generally an airfoil takes such form in order to provide for good air attachment without high turbulence.

Figure 6A:
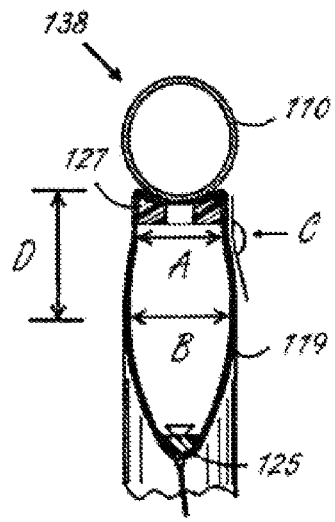
FIGS. 6A and 6C illustrate a cross-sectional view of a typical shaped rim and its corresponding unidirectional airfoil shape with the standard dimensions.
Figure 6B:
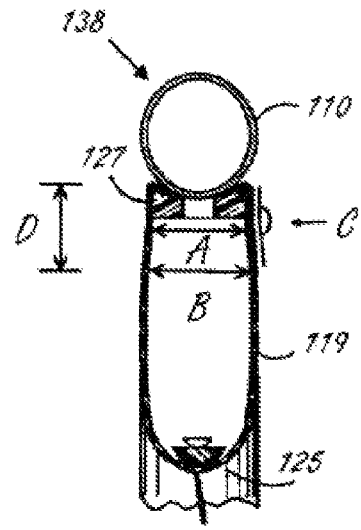
FIGS. 6B and 6D illustrate a cross-sectional view of a virtual dual leading edge shaped rim and its corresponding bi-directional airfoil shape or airflow pattern in accordance with exemplary embodiments.
Figure 6C:
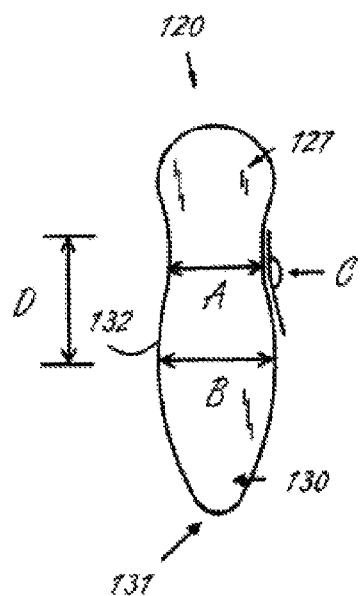

For example, FIGS. 6A and 6C illustrate a typical cross section and resulting airfoil shape, respectively, for typical rim designs. As shown, a leading edge width "A" is defined generally by the distance between opposing braking surfaces 127. A max width "B" is also defined some distance "D" along the chord length, which in prior art systems is usually greater than ⅓ of the overall rim depth. Based on these three measurements, a camber angle "C" is defined, which as described above is generally less than 175° in prior art systems, and preferably less than 165°. Note that the trailing edge of the airflow or airfoil shape airfoil in FIGS. 6A and 6C forms a narrowly tapered point, limited only by the diameter of the spoke and mechanism used to hold it in the rim. More specifically, conventional wisdom in the design of airfoil shapes for wheels and rims attempt to mimic the traditional teardrop airfoil design under the constraints or limitations of the necessary width of the spoke hole. As such, the rate of change of curvature at the spoke hole face becomes extremely large at or near the holes or center of the face surface, but quickly diminishes thereafter. While such traditional airfoil designs work well in stationary or unidirectional systems, such designs are not optimized for airflow in the reverse direction. In other words, prior art airfoil design's only operate effectively in a single direction, i.e., the front of the wheel; thus failing to achieve optimum airflow and resulting in unwanted air detachment and instability.

Figure 6D:
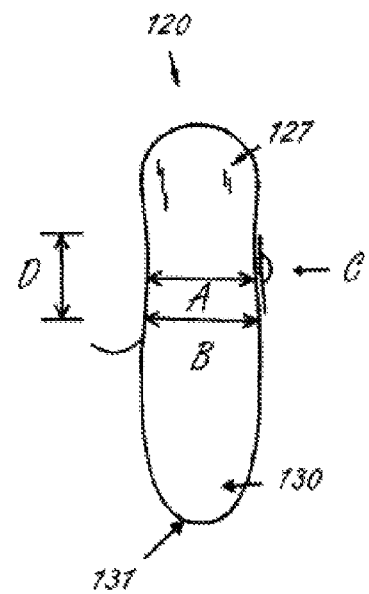

Example embodiments, however, have defined an optimum shape for airfoil that operate in a bi-directional manner. More specifically, as shown in FIGS. 6B and 6D, a rim cross section and resulting airfoil shape are shown with a large radius spoke hole face operational as both a trailing and leading edge of an airfoil. In other words, when combined with the tire 110, the oval or disk like airflow pattern shown in FIG. 6D of the rim provides virtually for two optimum leading edges that assist in maintaining flow attachment in either the forward or reverse directions of airflow travel. As seen, this notion of creating a large radius spoke face radius contradicts conventional wisdom in airfoil shapes, especially when evaluated in light of the unexpected stability and cross wind effects described below.

Note that although a particular shape of bi-directional rim is shown in FIG. 6B with the resulting airfoil in 6D, the actual shape and design will vary depending on several factors as described herein. For example, the following table contains spreadsheet data showing various rim designs and considerations based on the specific rims' depth, width, and camber angle relative to one another in accordance with example embodiments noted herein. Also note that the variables associated with the overall design features may deviate from the optimum values and design; however, such deviations may still conform to the general inventive concepts described herein. As such, any reference to a specific shape rim or its dimensions are used herein for illustrative purposes only, unless otherwise specifically claimed.

In accordance with one example embodiment, a process enables an optimum wheel by predefining a geometric shape based on a set of rim parameters and the above described bi-directional airfoil need. For example, referring to FIG. 6B, a combined geometry of rim 138 and tire 110 forms a leading edge LE diameter A and a trailing edge TE diameter B with connecting sidewalls 119. Note that a further consideration may be the camber angle C and/or the max width depth D at some percentage of the cord (as previously described and defined above). Alternatively, or in conjunction, the geometric shape and dimensions may be formed and defined based on tangency angles (see FIG. 10B) for the LE or TE. Regardless of the exact parameters used or the number of defined variables, the geometry formed by the intersection of the design parameters will resemble a geometry such as a parallelogram (e.g., preferably a rectangle), ellipsis, or other similar form that sets the outer bounds of the airfoil shape needed at the spoke face 125.

Next, in order to maintain flow attachment at the spoke face where the airflow will loose the highest amount of energy, the spoke face radius needs to be maintained above a certain threshold limit. In addition, the rate of change of curvature (i.e., the rate at which the curvature changes within on a per mm basis) needs to be evenly distributed along the spoke face 125. More specifically, the change of curvature from the trailing edge of one sidewall 119 to the next 119 cannot exceed a certain threshold and, preferably, maintain a uniform distribution and/or change gradually or continuously across the entire spoke face 125. In other words, if the geometric shape defines a square or rectangular boundary with a 90° turn at the max total depth where the spoke hole face begins (or ends), embodiments distribute the turning so that the radius of curvature is as high as possible within that space.

In summary, example embodiments use two or more of airfoil parameters (e.g., LE width, max width, TE width, tire diameter, camber angle, max depth total, for defining a geometry (e.g., a rectangle with a given width and depth) for a given rider application. With the outer limits of the airfoil shape set by the geometric shape, a virtual LE for the reverse flow is designed based on the objective of maintaining a high radius of curvature across the entire spoke face, while simultaneously holding the rate of change of curvature to a minimum. In other words, referring to FIG. 6D, based on the need for bi-directional airflow, example embodiments achieve an optimum airfoil design through setting of at least two desired airfoil parameters, e.g., LE (A) and Max (B) diameters (preferably within the above described optimum solutions). These values then define geometric boundaries 130 used for then setting a curve 131 (i.e., spoke hole face 125) with a series of radial arcs above a set threshold, the rate of which cannot change beyond a per linear limit.

Note that such values of the smallest radius and highest rate of change of curvature will again vary depending on the rim type, size, and desired parameters. Nevertheless, preferably the radius or curvature (i.e., the minimum radius defined at any given point along the curve set by the bounds of the sidewall 119 and the max rim depth or edge of the spoke hole face 125) needs to be greater than about 6 mm (with an upper-lower bound generally not to exceed 15 mm, i.e., the smallest radius along the curvature no larger than 15 mm) to avoid flow separation at the virtual leading edge (i.e., over the back of the wheel). Further, the gradual curvature transition (i.e., the increase/decrease of curvature or radius to improve flow attachment) changes preferably by no more than about 60 mm/linear mm.

Figure 9:
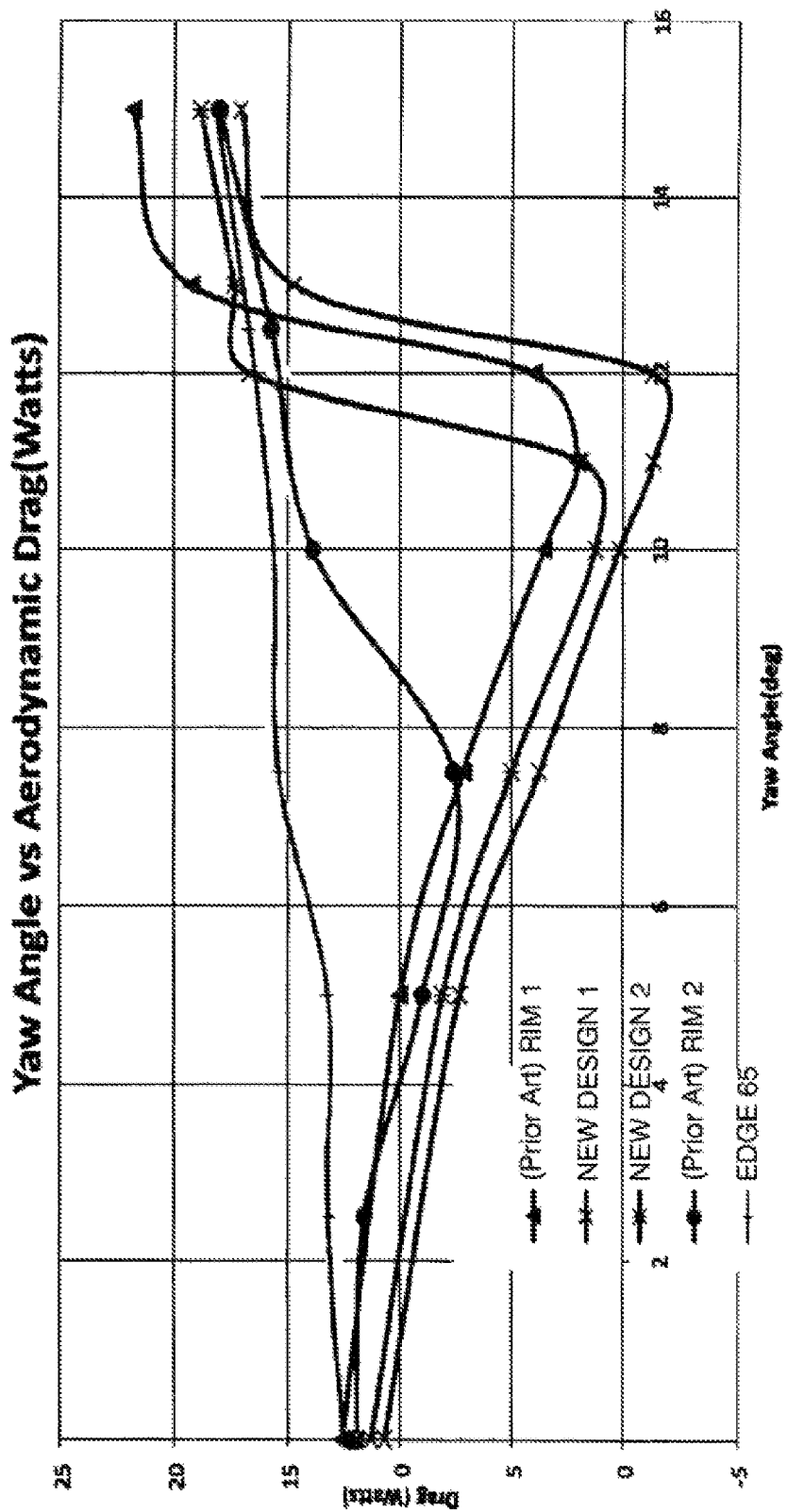
FIG. 9 shows measured yaw angles compared to aerodynamic drag for standard rims and optimum rims that utilize various advantageous features of the present invention.

As shown in FIG. 9, one of the unexpected and advantageous features of the above described bi-directional airfoil is that the flow generates a low pressure region, which produces a lift or side force. This side force then results in lower drag in the direction of travel. Similarly, the balanced side force generated in each flow direction by the bi-directional airfoil shape does lessons the amount of steering torque felt by the rider. In other words, with the balanced airflow design around the rim, in the presence of a side wind the force remains equal on the front and rear part of the rim; therefore, the rider doesn't feel the wind trying to turn the wheel.

As previously described, most bicycle rims that attempt to reduce drag with standard airfoil shapes with large angles of discontinuity as the sidewalls approach the spoke hole or trailing edge of the airfoil-shaped rim and/or at the boundary line of the spoke holes themselves. For example, many competing rims have overly wide max widths at locations further back along the chord, and therefore, they ultimately need to make drastic adjustments in the slope of the sidewalls just after the max width location and often again at some distance close to the spoke holes. Further, most rims have large discontinuities in curvature at the spoke hole boundary (i.e., where the chord intersects the trailing edge) in order to approximate the typical airfoil sharper edge shape. In addition, this boundary line also inherently forms discontinuities due to manufacturing techniques of some composite wheels designs (e.g., when combining two halves or shells).

Figure 7:
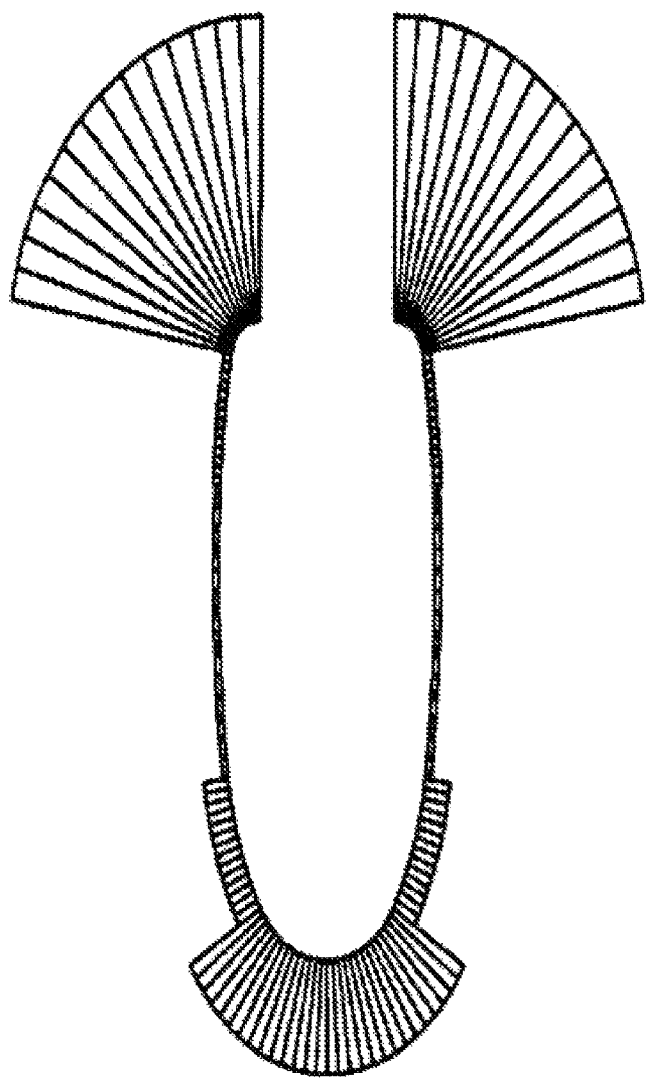
FIG. 7 illustrates the discontinuity for a rate of change of curvature around a cross section of a typical prior art rim.
Figure 10B:
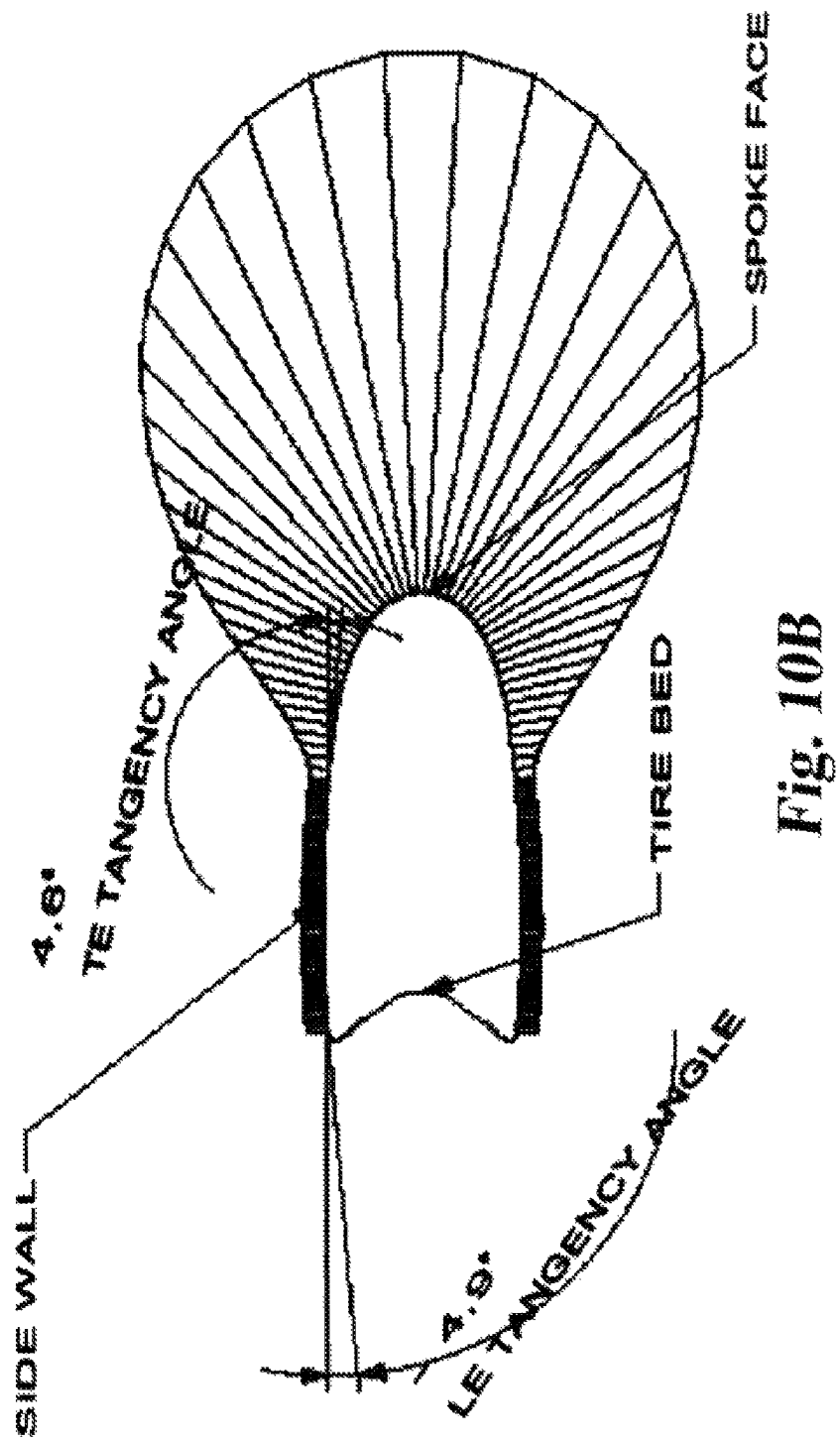

FIGS. 7, 10A, and 10B are graphical aids showing the differences in the change of curvature between a previous rim design with large discontinuities curvature (FIG. 7) and example embodiment rim designs having continuous changes in curvature (FIGS. 10A and 10B). These figures show a graphical aid tool commonly called a "curvature comb" or "hedgehog or porcupine curve." The length of the lines (splines or spokes) running radially from the surface of the rim represent the curvature (K). It should be noted that the length of these curvature (K) lines and the density of these lines are typically based on an arbitrary scale that best shows the curvature (K). The change of length between each of these lines provide a visual aid for evaluating the change in curvature ($\partial K$) as well as the rate of change (or acceleration) in the change of curvature ($\partial K'$) along the length of the rim.

Continuity between surfaces (i.e., how smoothly they connect to one another) can be characterized based on a number different levels or classes of continuity. Positional or touching continuity, commonly referred to as G0 continuity, occurs whenever the end positions of two curves or surfaces touch. With G0 continuity, the curves or surfaces can meet at an angle, thereby having sharp corners or edges. Tangential or G1 continuity requires the end vectors of the curves or surfaces to be parallel where they meet, thereby ruling out sharp edges. With G1 continuity, the curves or surfaces share a common tangent direction at the location where two curves or surfaces meet. To put it another way, G1 continuity means that the two curves not only touch, but they go the same direction at the point where they touch G2 or curvature continuity further requires the end vectors to be of the same length and rate of length change. In other words, G2 continuity additionally requires that the curves (or surfaces) not only go the same direction when they meet, but also have the same radius (R) or curvature (K) that point where they meet. G3 or curvature acceleration continuity requires an even a higher degree of continuity than G2 by adding another requirement to the continuity, planar acceleration. Curves that are G3 continuous touch (G0), go the same direction (G1), have the same radius or curvature (G2), and that radius (R) or curvature (K) is accelerating at the same rate where the curves or surfaces meet.

FIG. 7 illustrates one example of a previous rim design having large discontinuities in curvature. As can be seen, the rim has a number of areas where there are dramatic changes or discontinuities in the rate of change of curvature. The FIG. 7 rim can be characterized as having at most G1 or tangential continuity. Such discontinuous curvatures (e.g., the one shown in FIG. 7) or poorly designed airfoil rims (and especially those with discontinuities in the rate of change of curvature around the spoke hole face) create unwanted drag for less than optimal performance. In other words, due to conventional wisdom about airfoils and current manufacturing limitations, typical so called "high performance" wheels stall prematurely in crosswinds and produce unwanted airflow surface detachment and turbulence.

Figure 8:
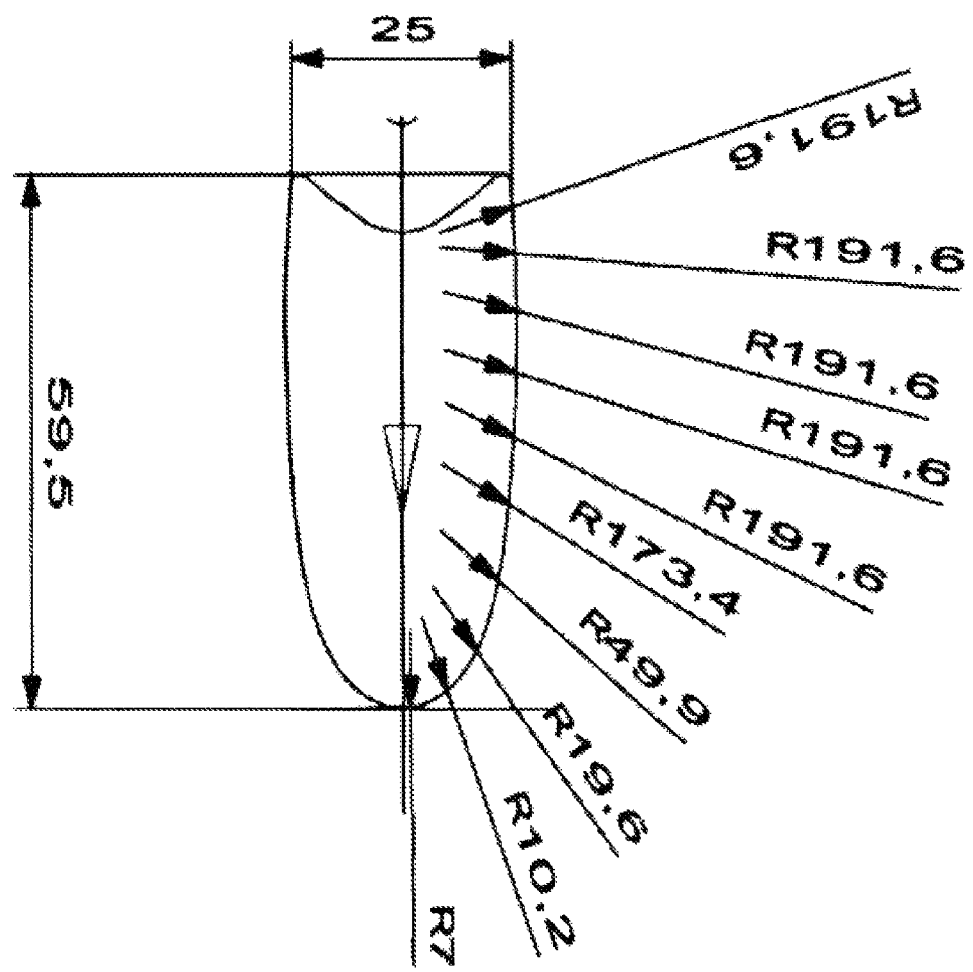
FIG. 8 illustrates how to define the radius and rate of change of curvature for describing exemplary embodiments of the present invention.

In contrast, the rims depicted in FIGS. 10A and 10B exhibit G3 continuity. As shown in FIGS. 10A and 10B, the example embodiments provide for an evenly distributed rate of change of curvature over the entire surface of the rim and a continuous or gradual rate of change of curvature (also known as a class "A" surface modeling) along the spoke face or boundary. More specifically, the rate of change of curvature is uniformly distributed or gradually occurs over the entire geometric length of the spoke face, which varies in length between about 51 and 60 mm depending on the rim depth (see the chart below for more details on how such geometries vary). The radius of curvature is ever reducing from the sidewall to the center of the spoke face. In particular, the radius is always reducing around the spoke face from a maximum at the intersection with the sidewall to a minimum at the center of the spoke face. In other words, example embodiments limit the linear turning radius of a spoke face from the sidewall to the spoke hole face itself in order to ensure airflow attachment, especially in the reverse airflow direction (i.e., on the back side of the rim). Related to such change is the actual radius size across the spoke hole face (see, e.g., FIG. 8), wherein other embodiments (as previously mentioned) attempt to keep the radius at any given point above a threshold (e.g., above 6 mm with a lower limit of not greater than about 15 mm).

Figure 11:
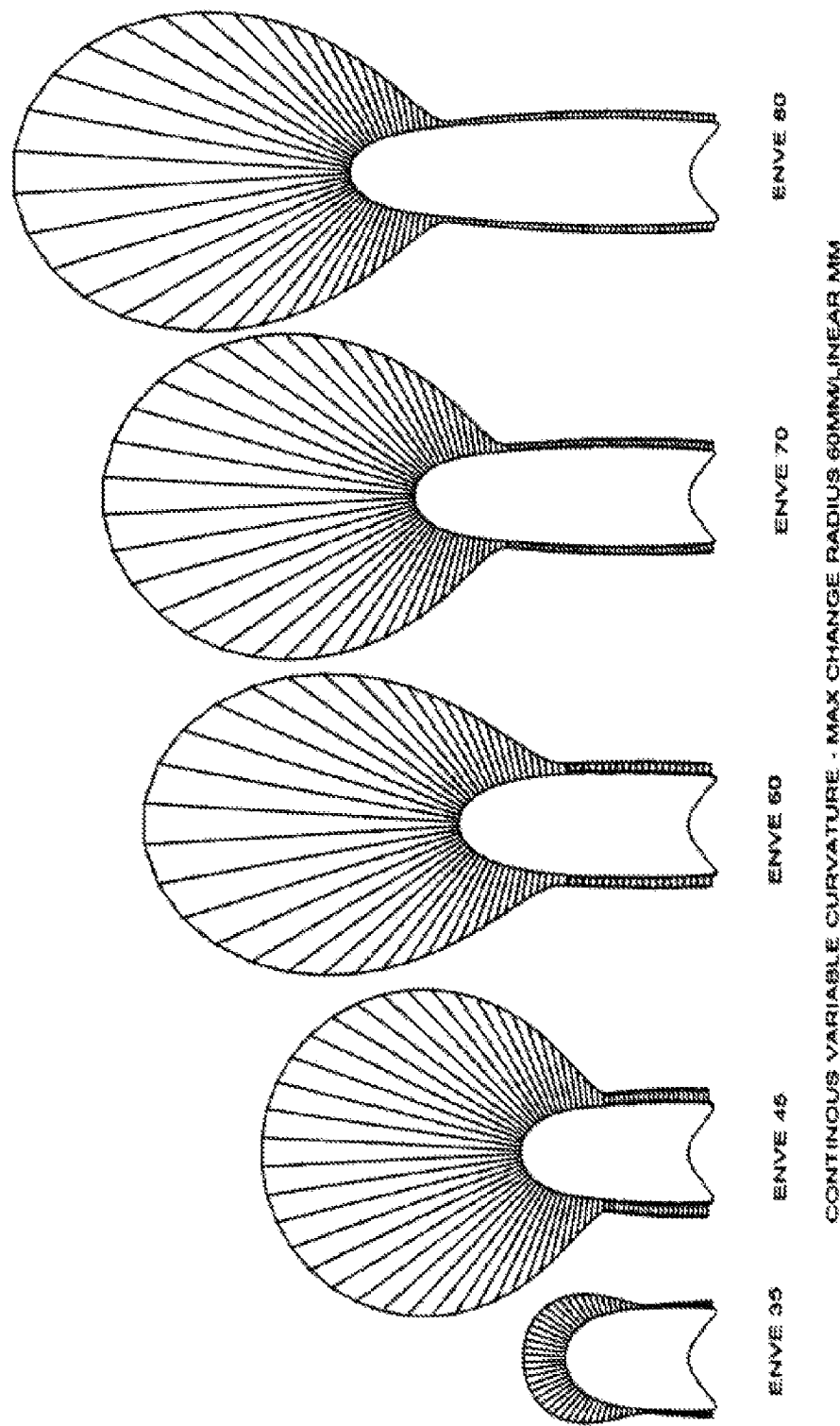
FIG. 11 illustrates a continuous rate of change of curvature having G3 continuity for various standard sized wheel depths in accordance with exemplary embodiments of the present invention.

The family of curves in FIG. 11 show how the rate of change in the change in curvature (i.e., second derivative of curvature or $\partial K'$) is gradual throughout the entire sidewall and spoke face. Again, it should be recognized that the rims in FIG. 11 have G3 continuity. Moreover, the rims in the illustrated examples start with a high radius of curvature at the sidewall (greater than 100 mm) and finish with a small radius of curvature (approximately 10 mm) at the spoke face. As can be seen in FIG. 11, the derivative in the change of curvature ($\partial K'$) has been minimized as much as the geometry will allow.

Although no upper radius need be set, in some instances the maximum radius size is bound by the geometric limitations of the rim size and shape itself. For example, as shown in FIG. 12C and the table below, a shallow 35 mm rim does not allow enough length to achieve a large radius of curvature, so the max radius is only 150 mm. On a deep section rim (e.g., the 70 and 85 shown in the table below), however, much larger curvatures (e.g., 420 mm and above) are possible. Note that the sidewall 119 shape is compromised so that it bends into the spoke face. As such, considering the sidewall when flow comes from the tire (i.e., the forward direction), the leading edge angle It should be noted that this unconventional design for a spoke face surface advantageously and surprisingly generates side forces at higher yaw angles so that the part of the wheel behind a fork turns the wheel back into the wind. As such, example embodiments that optimizing the side force (lift) on the front part of the rim ahead of the fork and the efficiencies gained from the spoke hole face in the rear part of the rim, the wheel remains stable in windy conditions.

Referring again to FIG. 7, as well as the corresponding data shown in Tables 1 and 2 below, a typical cross section of a rim with discontinuity across the entire surface of the rim, and especially at the spoke face and leading edge. It should be noted that for all of the tables below that the radius (R) and its inverse, curvature (K) values are given at individual points. While the gradient or rate of change of curvature ($\partial K$) has been provided in the tables below, it should be appreciated these changes could also be represented by the rate of change in the radius of curvature per traveling distance ($\partial R$). Note that although the rate of change of radius is steady over various areas of the rim surface, such holding the radius steady creates the stepping pattern noted from the transitions. As previously mentioned, this is typically due to such things as: high camber angle levels at the sidewalls; the maximum width occurring too far down the distance of the chord; and/or the spoke face occurring over a short distance, which occurs from their failure to use high radius of curvatures overall (as the present invention does). In other words, without the advantageous recognition of the present invention for optimizing the overall aerodynamic properties of a rim, the prior art designs, like the one shown in FIG. 7, result in high curvature rates (i.e., typically larger than 60 mm/linear mm. As such, the prior art fails to achieve an optimum bi-directional airfoil rim.

Table 1 illustrates the various dimensions of the rim shown in FIG. 7.

TABLE 1

Measurement Data for a Prior Art Rim of FIG. 7

| | Prior Art Rim |
|---|---|
| Leading Edge (x) | −5.92 |
| Leading Edge Width | 16.927 |
| LE Side Wall (x) | −3.03 |
| LE Side Wall Width | 24.018 |
| LE Tangency Angle | |
| TE Tangency Angle | |
| Max Width (x) | 16.6641 |
| Max Width | 27.26 |
| Max Width Chord | |
| Spoke Face (X) | 55.2808 |
| Max Depth Total (mm) | 61.2008 |
| Camber Angle (Sidewall) | 4.7117 |
| Max Width (% Chord) | 36.9016418 |
| Sidewall LE Radius | 101.6 |
| Sidewall TE Radius | 141.522 |
| Sidewall Length | 38.82112 |
| Gradient (RadCurv/Linear mm) | 1.02835776 |
| Total Length of spoke face | 45.28 |
| Maximum radius of curvature gradient | 13.67 |

Table 2 shows the radius of curvature and gradient measurements along with the gradient change at various sample locations along the spoke face of the prior art rim depicted in FIG. 7. Looking again at FIG. 7 (as well as shown in Table 2 below), the changes in curvature are very much discontinuous. As will be described in greater detail below, the rate of change in the change of curvature/gradient ($\partial K'$) or the second differential of the curvature (K) for the prior art rim in FIG. 7 is a magnitude of ten times larger than the inventive rim designs described herein.

TABLE 2

Rate of Change of Curvature Data of Prior Art Rim of FIG. 7

| Sample | Curvilinear Position Along Spoke Face (mm) | Radius (mm) | Curvature (K) | Curvilinear Distance (L) (mm) | Gradient ($\partial K$) (mm/mm) | Gradient Derivative ($\partial K'$) (mm/mm$^2$) |
|---|---|---|---|---|---|---|
| 0 | 0 | 31.75 | 0.031 | | | |
| 1 | 1.617 | 31.75 | 0.031 | 1.617 | 0.000 | |
| 2 | 3.234 | 31.75 | 0.031 | 1.617 | 0.000 | |
| 3 | 4.851 | 31.75 | 0.031 | 1.617 | 0.000 | 0 |
| 4 | 6.468 | 31.75 | 0.031 | 1.617 | 0.000 | 0 |
| 5 | 8.085 | 31.75 | 0.031 | 1.617 | 0.000 | 0 |
| 6 | 9.702 | 31.75 | 0.031 | 1.617 | 0.000 | 0 |
| 7 | 11.319 | 31.75 | 0.031 | 1.617 | 0.000 | 0 |
| 8 | 12.936 | 9.648 | 0.104 | 1.617 | 0.045 | 0.0276 |
| 9 | 14.553 | 9.648 | 0.104 | 1.617 | 0.000 | 0.0276 |
| 10 | 16.17 | 9.648 | 0.104 | 1.617 | 0.000 | 0 |
| 11 | 17.787 | 9.648 | 0.104 | 1.617 | 0.000 | 0 |
| 12 | 19.404 | 9.648 | 0.104 | 1.617 | 0.000 | 0 |
| 13 | 21.021 | 9.648 | 0.104 | 1.617 | 0.000 | 0 |
| 14 | 22.638 | 9.648 | 0.104 | 1.617 | 0.000 | 0 |
| | | Maximum | | | 0.045 | 0.0276 |

The following tables illustrate some measured values of various prototype rims constructed in accordance with exemplary embodiments described herein. Although embodiments may reference values therein, such reference is for illustrative purposes and does not limit or otherwise narrow the scope of the present invention unless otherwise explicitly claimed.

Table 3 below lists the various dimensions of the 35, 45, 60, 70, 85, and 95 millimeter rims respectively illustrated in FIGS. 13, 14, 15, 16, 17, and 18. All of the measurements in the tables below are in millimeters unless specified otherwise, such as specifying a specific percentage. Table 3 below illustrates the various dimensions of the various size rims according to various examples. For each size rim, the radius of curvature was measured at various positions along the spoke face. The following tables will describe those measurements as well as the gradient and change in gradient at the specific points. It should be noted that the camber angle measurements in Table 3 as well as elsewhere in the present application are measured from the leading edge rather than some other location, such as from behind the braking surface.

TABLE 3

Various Dimensions of Rims Illustrated in FIGS. 13, 14, 15, 16, 17, and 18

| | 35 mm | 45 mm | 60 mm | 70 mm | 85 mm | 95 mm |
|---|---|---|---|---|---|---|
| Leading Edge (x) | −6.49 | −6.02 | −6.49 | −6.02 | −6.49 | −6.49 |
| Leading Edge Width | 23.34 | 22.26 | 23.24 | 22.27 | 23.34 | 22.27 |
| LE Side Wall (x) | −5.29 | −5.29 | −6.49 | −5.29 | −6.49 | −5.29 |
| LE Side Wall Width | 24.95 | 22.95 | 24.95 | 22.95 | 24.95 | 22.95 |
| LE Tangency Angle | 4.86 | 4.86 | 4.88 | 4.86 | 4.88 | 4.88 |
| TE Tangency Angle | 3.72 | 4.22 | 4.57 | 5.08 | 6.08 | 5.08 |
| Max Width (x) | 0.82 | 6.34 | 10.40 | 17.27 | 17.05 | 31.53 |
| Max Width | 25.44 | 23.99 | 26.28 | 24.68 | 26.89 | 25.62 |
| Max Width Chord Spoke Face (X) | 28.28 | 38.51 | 53.02 | 63.49 | 78.40 | 88.50 |
| Max Depth Total (mm) | 34.77 | 44.53 | 59.51 | 69.51 | 84.89 | 94.99 |
| Camber Angle (Sidewall) | 2.30 | 2.45 | 2.42 | 2.21 | 2.49 | 2.10 |
| Max Width (% Chord) | 21.04 | 27.76 | 28.37 | 33.50 | 27.73 | 40.03 |
| Sidewall LE Radius | 58.80 | 145.80 | 182.20 | 233.00 | 257.23 | 368.00 |
| Sidewall TE Radius | 136.30 | 164.80 | 205.38 | 327.14 | 421.04 | 443.00 |
| Sidewall Length | 13.60 | 23.60 | 33.44 | 41.86 | 61.00 | 69.70 |
| Gradient (RadCurv/Linear mm) | 5.70 | 0.81 | 0.69 | 2.25 | 2.69 | 6.36 |
| START Radius/Length Radius Ratio | 4.32 | 6.18 | 5.45 | 5.57 | 4.22 | 5.28 |
| END Radius/Length Radius Ratio | 10.02 | 6.98 | 6.14 | 7.82 | 6.90 | 6.36 |
| Spoke Face Start Radius | 136.30 | 164.80 | 205.38 | 327.14 | 421.04 | 443.00 |
| Spoke Face Min Radius | 10.30 | 8.37 | 6.89 | 7.02 | 6.45 | 6.12 |
| Total Length of Spoke Face | 57.48 | 51.46 | 60.32 | 53.21 | 55.25 | 57.20 |
| Maximum Radius of Curvature Gradient | 18.12 | 23.05 | 24.16 | 61.29 | 83.54 | 81.82 |

Figure 19:
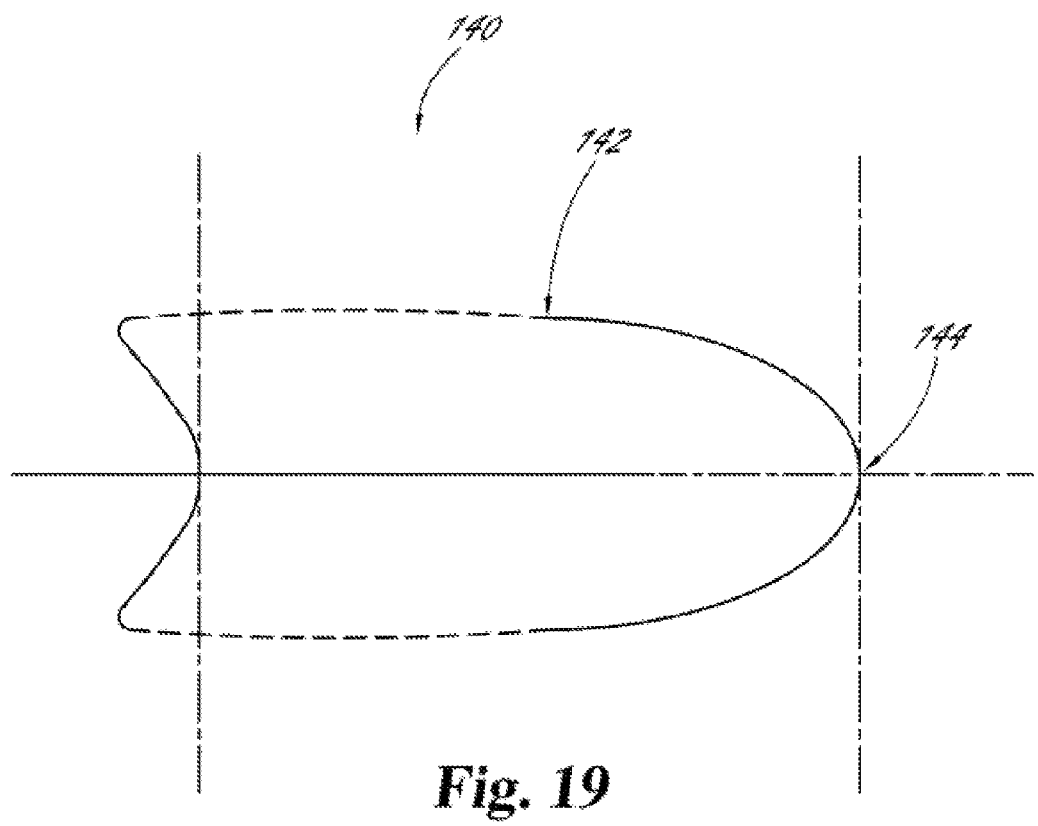
FIG. 19 is a cross-sectional view of a rim illustrating the various points at which the radius of curvature were measured for the data contained in Tables 3 through 9.

To help illustrate where the measurements occur in Tables 2 and 4-9, FIG. 19 illustrates a cross-sectional view of a rim 140 and the various location measurements along the spoke face. Reference numeral 142 in FIG. 19 indicates the initial or zero sample location reference point, and reference numeral 144 indicates the stop or end point for the sample measurements. For the measurements in Table 2, fifteen (including sample point zero) measurements of radius of curvature were made from the initial sample location 142 ($P_0$) to the end point 144 ($P_{14}$), and in Tables 3-9, thirteen samples were measured (i.e., sample points $P_0$ to $P_{12}$) between the initial sample location 142 to the end point 144. It should be noted that since the rim 140 is symmetrical, the radius of curvature (K) should generally be the similar at similar sides of the spoke face. The curvilinear position along the spoke face was measured relative to the initial sample location 142. For example, sample location number 1 in Table 4 was 2.4 mm from the sample point 0 on the spoke face. At each of the sample points, the radius was measured. It should be appreciated that the rate of change of curvature or gradient (∂K), which is indicated by column header "Gradient" in Tables 2 and 4-9, is calculated using Equation 2. The derivative of the gradient (∂K'), which has the "Gradient Derivative" column heading, shows the second derivative of the curvature (K) per curvilinear travel distance (L). In other words, the derivative of the gradient column represents the rate of rate of change in the change of curvature, or in other words, the acceleration of the curvature. It should be noted that the gradient derivative (∂K') column in the tables has been calculated using the absolute value of the difference between the gradients. These tables also provide the maximum gradient and the maximum change in gradient.

Table 4 below provides the rate of change of curvature (or gradient) data for the 45 mm rim illustrated in FIG. 14 and referenced in Table 3.

TABLE 4

Figure 13:
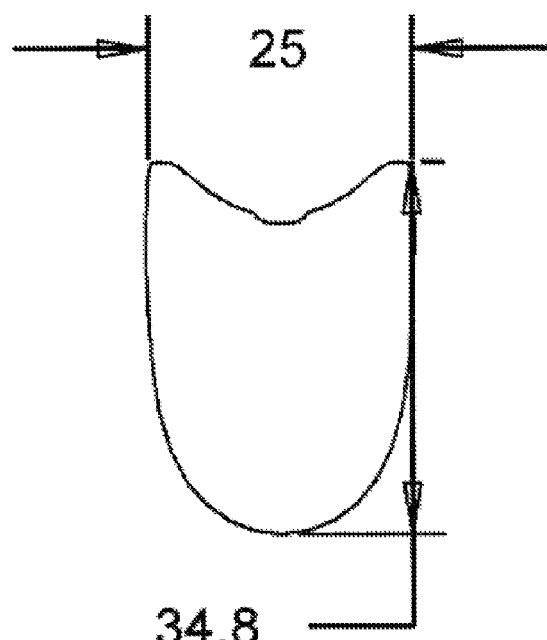
FIG. 13 is a cross-sectional view of a 35 millimeter depth rim described in Table 3.

Rate of Change of Curvature Data for 35 mm Rim Illustrated in FIG. 13

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm²) |
|---|---|---|---|---|---|---|
| 0 | 0 | 136.30 | 0.0073 | | | |
| 1 | 2.395 | 103.30 | 0.0097 | 2.40 | 0.0010 | |
| 2 | 4.79 | 59.90 | 0.0167 | 2.40 | 0.0029 | 0.0008 |
| 3 | 7.185 | 37.50 | 0.0267 | 2.40 | 0.0042 | 0.0005 |
| 4 | 9.58 | 26.00 | 0.0385 | 2.40 | 0.0049 | 0.0003 |
| 5 | 11.975 | 19.50 | 0.0513 | 2.40 | 0.0054 | 0.0002 |
| 6 | 14.37 | 15.40 | 0.0649 | 2.40 | 0.0057 | 0.0001 |
| 7 | 16.765 | 12.90 | 0.0775 | 2.40 | 0.0053 | 0.0002 |
| 8 | 19.16 | 11.40 | 0.0877 | 2.40 | 0.0043 | 0.0004 |
| 9 | 21.555 | 10.70 | 0.0935 | 2.40 | 0.0024 | 0.0008 |
| 10 | 23.95 | 10.40 | 0.0962 | 2.40 | 0.0011 | 0.0005 |
| 11 | 26.345 | 10.30 | 0.0971 | 2.40 | 0.0004 | 0.0003 |
| 12 | 28.74 | 10.30 | 0.0971 | 2.40 | 0.0000 | 0.0002 |
| | | | Maximum | | 0.0057 | 0.0008 |

Table 5 below provides the rate of change of curvature (or gradient) data for the 45 mm rim illustrated in FIG. 14 and referenced in Table 3.

TABLE 5

Figure 14:
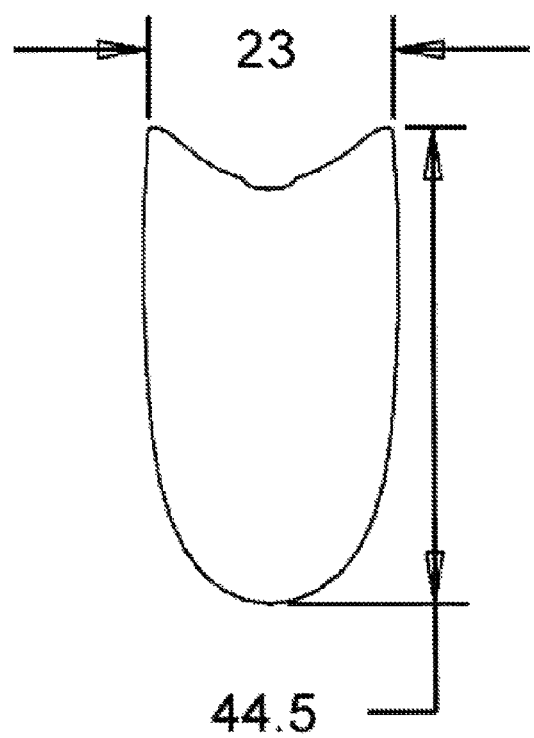
FIG. 14 is a cross-sectional view of a 45 millimeter depth rim described in Table 3.

Rate of Change of Curvature Data for 45 mm Rim Illustrated in FIG. 14

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm²) |
|---|---|---|---|---|---|---|
| 0 | 0.00 | 165.90 | 0.0060 | | | |
| 1 | 2.14 | 118.83 | 0.0084 | 2.14 | 0.0011 | |
| 2 | 4.29 | 91.76 | 0.0109 | 2.14 | 0.0012 | 0.0000 |
| 3 | 6.43 | 42.34 | 0.0236 | 2.14 | 0.0059 | 0.0022 |
| 4 | 8.58 | 29.25 | 0.0342 | 2.14 | 0.0049 | 0.0005 |
| 5 | 10.72 | 21.49 | 0.0465 | 2.14 | 0.0058 | 0.0004 |
| 6 | 12.86 | 16.57 | 0.0604 | 2.14 | 0.0064 | 0.0003 |
| 7 | 15.01 | 13.54 | 0.0739 | 2.14 | 0.0063 | 0.0001 |
| 8 | 17.15 | 11.36 | 0.0880 | 2.14 | 0.0066 | 0.0001 |
| 9 | 19.30 | 9.82 | 0.1018 | 2.14 | 0.0064 | 0.0001 |
| 10 | 21.44 | 9.01 | 0.1110 | 2.14 | 0.0043 | 0.0010 |
| 11 | 23.58 | 8.54 | 0.1171 | 2.14 | 0.0029 | 0.0007 |
| 12 | 25.73 | 8.37 | 0.1195 | 2.14 | 0.0011 | 0.0008 |
| | | | Maximum | | 0.0066 | 0.0022 |

Table 6 below provides the rate of change of curvature (or gradient) data for the 60 mm rim illustrated in FIG. 15 and referenced in Table 3.

TABLE 6

Rate of Change of Curvature Data for 60 mm Rim Illustrated in FIG. 15

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm$^2$) |
|---|---|---|---|---|---|---|
| 0 | 0.00 | 205.45 | 0.0049 | | | |
| 1 | 2.51 | 158.62 | 0.0063 | 2.51 | 0.0006 | |
| 2 | 5.02 | 97.99 | 0.0102 | 2.51 | 0.0016 | 0.0004 |
| 3 | 7.53 | 64.64 | 0.0155 | 2.51 | 0.0021 | 0.0002 |
| 4 | 10.04 | 44.89 | 0.0223 | 2.51 | 0.0027 | 0.0002 |
| 5 | 12.55 | 32.66 | 0.0306 | 2.51 | 0.0033 | 0.0002 |
| 6 | 15.06 | 24.21 | 0.0413 | 2.51 | 0.0043 | 0.0004 |
| 7 | 17.57 | 18.35 | 0.0545 | 2.51 | 0.0053 | 0.0004 |
| 8 | 20.08 | 13.91 | 0.0719 | 2.51 | 0.0069 | 0.0007 |
| 9 | 22.59 | 10.79 | 0.0927 | 2.51 | 0.0083 | 0.0005 |
| 10 | 25.10 | 8.73 | 0.1145 | 2.51 | 0.0087 | 0.0002 |
| 11 | 27.61 | 7.43 | 0.1346 | 2.51 | 0.0080 | 0.0003 |
| 12 | 30.11 | 6.89 | 0.1452 | 2.51 | 0.0042 | 0.0015 |
| | | Maximum | | | 0.0087 | 0.0015 |

Table 7 below provides the rate of change of curvature (or gradient) data for the 70 mm rim illustrated in FIG. 16 and referenced in Table 3.

TABLE 7

Rate of Change of Curvature for 70 mm Rim Illustrated in FIG. 16

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm$^2$) |
|---|---|---|---|---|---|---|
| 0 | 0.00 | 327.31 | 0.0031 | | | |
| 1 | 2.22 | 191.42 | 0.0052 | 2.22 | 0.0010 | |
| 2 | 4.43 | 93.92 | 0.0106 | 2.22 | 0.0024 | 0.0007 |
| 3 | 6.65 | 54.57 | 0.0183 | 2.22 | 0.0035 | 0.0005 |
| 4 | 8.87 | 36.66 | 0.0273 | 2.22 | 0.0040 | 0.0003 |
| 5 | 11.09 | 26.13 | 0.0383 | 2.22 | 0.0050 | 0.0004 |
| 6 | 13.30 | 19.46 | 0.0514 | 2.22 | 0.0059 | 0.0004 |
| 7 | 15.52 | 14.89 | 0.0672 | 2.22 | 0.0071 | 0.0005 |
| 8 | 17.74 | 11.76 | 0.0851 | 2.22 | 0.0081 | 0.0004 |
| 9 | 19.95 | 9.65 | 0.1036 | 2.22 | 0.0084 | 0.0001 |
| 10 | 22.17 | 8.19 | 0.1221 | 2.22 | 0.0083 | 0.0000 |
| 11 | 24.39 | 7.40 | 0.1352 | 2.22 | 0.0059 | 0.0011 |
| 12 | 26.60 | 7.02 | 0.1426 | 2.22 | 0.0033 | 0.0012 |
| | | Maximum | | | 0.0084 | 0.0012 |

Table 8 below provides the rate of change of curvature (or gradient) data for the 85 mm rim illustrated in FIG. 17 and referenced in Table 3.

TABLE 8

Figures 17, 18:
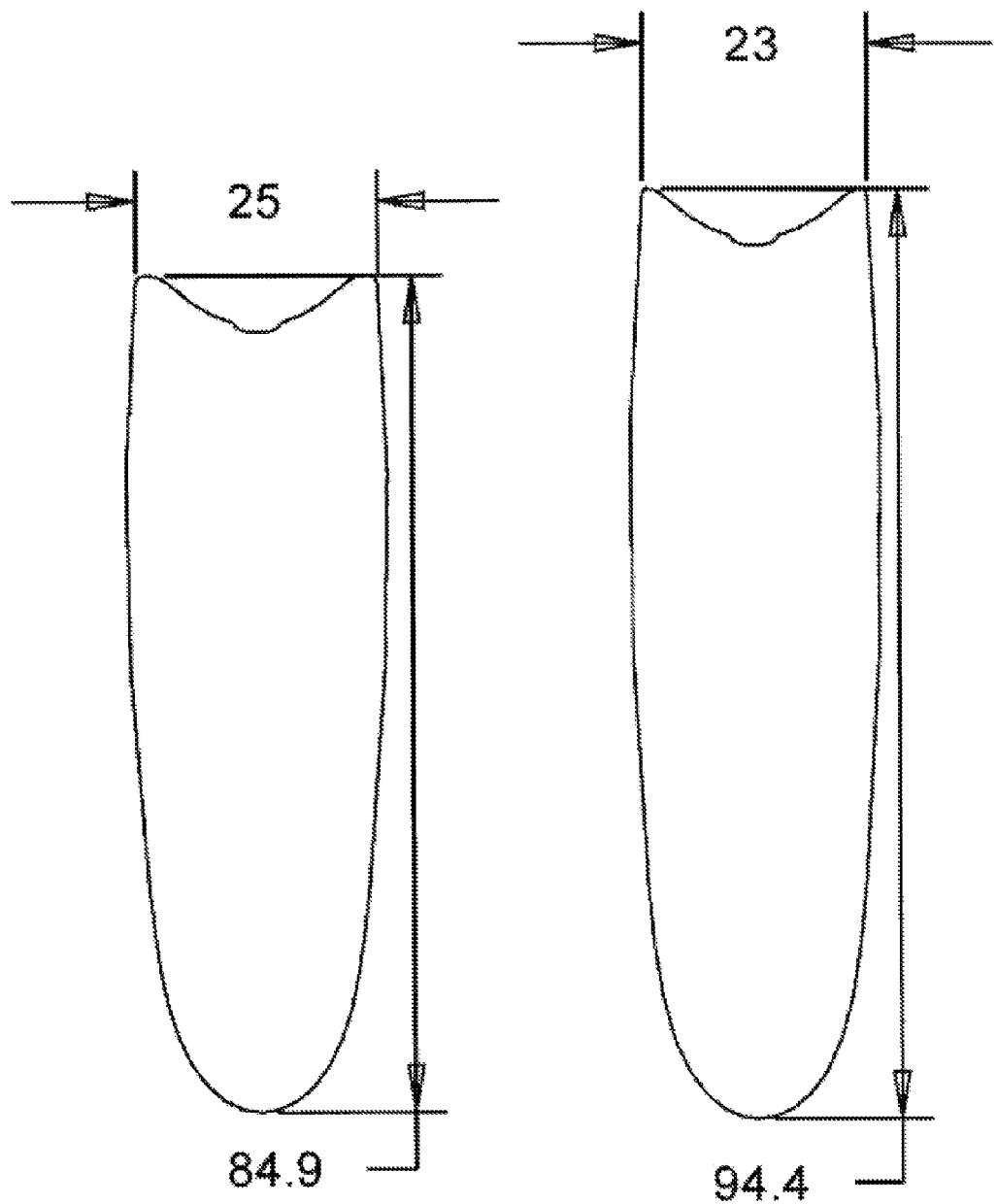
FIG. 17 is a cross-sectional view of an 85 millimeter depth rim described in Table 3.
FIG. 18 is a cross-sectional view of a 95 millimeter depth rim described in Table 3.

Rate of Change of Curvature Data for 85 mm Rim Illustrated in FIG. 17

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm$^2$) |
|---|---|---|---|---|---|---|
| 0 | 0.00 | 420.25 | 0.0024 | | | |
| 1 | 2.30 | 227.95 | 0.0044 | 2.30 | 0.0009 | |
| 2 | 4.60 | 108.96 | 0.0092 | 2.30 | 0.0021 | 0.0005 |
| 3 | 6.91 | 61.39 | 0.0163 | 2.30 | 0.0031 | 0.0004 |
| 4 | 9.21 | 42.89 | 0.0233 | 2.30 | 0.0031 | 0.0000 |
| 5 | 11.51 | 29.10 | 0.0344 | 2.30 | 0.0048 | 0.0008 |
| 6 | 13.81 | 21.36 | 0.0468 | 2.30 | 0.0054 | 0.0003 |

TABLE 8-continued

Rate of Change of Curvature Data for 85 mm Rim Illustrated in FIG. 17

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm²) |
|---|---|---|---|---|---|---|
| 7 | 16.11 | 16.52 | 0.0605 | 2.30 | 0.0060 | 0.0002 |
| 8 | 18.42 | 13.04 | 0.0767 | 2.30 | 0.0070 | 0.0005 |
| 9 | 20.72 | 10.08 | 0.0992 | 2.30 | 0.0098 | 0.0012 |
| 10 | 23.02 | 7.99 | 0.1251 | 2.30 | 0.0113 | 0.0007 |
| 11 | 25.32 | 6.95 | 0.1440 | 2.30 | 0.0082 | 0.0013 |
| 12 | 27.62 | 6.45 | 0.1551 | 2.30 | 0.0048 | 0.0015 |
| | | Maximum | | | 0.0113 | 0.0015 |

Table 9 below provides the rate of change of curvature (or gradient) data for the 95 mm rim illustrated in FIG. 18 and referenced in Table 3.

TABLE 9

Rate of Change of Curvature Data for 95 mm Rim Illustrated in FIG. 18

| Sample | Curvilinear Position Along Spoke Face (mm) | Radius (mm) | Curvature (K) | Curvilinear Distance (L) (mm) | Gradient (∂K) (mm/mm) | Gradient Derivative (∂K') (mm/mm²) |
|---|---|---|---|---|---|---|
| 0 | 0.00 | 443.00 | 0.0023 | | | |
| 1 | 2.38 | 248.00 | 0.0040 | 2.38 | 0.0007 | |
| 2 | 4.77 | 101.30 | 0.0099 | 2.38 | 0.0025 | 0.0007 |
| 3 | 7.15 | 68.03 | 0.0147 | 2.38 | 0.0020 | 0.0002 |
| 4 | 9.53 | 45.47 | 0.0220 | 2.38 | 0.0031 | 0.0004 |
| 5 | 11.92 | 31.43 | 0.0318 | 2.38 | 0.0041 | 0.0004 |
| 6 | 14.30 | 23.02 | 0.0434 | 2.38 | 0.0049 | 0.0003 |
| 7 | 16.68 | 16.62 | 0.0602 | 2.38 | 0.0070 | 0.0009 |
| 8 | 19.07 | 12.45 | 0.0803 | 2.38 | 0.0085 | 0.0006 |
| 9 | 21.45 | 9.73 | 0.1028 | 2.38 | 0.0094 | 0.0004 |
| 10 | 23.83 | 7.61 | 0.1314 | 2.38 | 0.0120 | 0.0011 |
| 11 | 26.22 | 6.41 | 0.1559 | 2.38 | 0.0103 | 0.0007 |
| 12 | 28.60 | 6.12 | 0.1635 | 2.38 | 0.0032 | 0.0030 |
| | | Maximum | | | 0.0120 | 0.0030 |

As mentioned before, the rims designed according to the present invention have a rate of change of curvature or gradient (∂K) that is gradual and continuous. Specifically, the rims along the sidewalls and spoke face have G3 continuity. To quantify these properties, the rims according to the present invention do not have dramatic changes in curvature such that rate of change of curvature or gradient (∂K) is low (i.e., gradual) and the acceleration of the curvature (i.e., the rate of change in the rate of change of curvature) or gradient derivative (∂K') is also low (i.e., continuous). Out of all of the example embodiments above, the maximum gradient was 0.0113 mm/mm for the 80 mm rim, and the maximum gradient derivative (∂K') was 0.0030 mm/mm² for the 95 mm rim. These values are in sharp contrast to the prior art rim in FIG. 7 that has an abrupt and discontinuous rate of change of curvature. Specifically, the prior art rim in FIG. 7 has a maximum rate of change of curvature (∂K) of 0.045 mm/mm and a maximum rate of change in the rate of change of curvature (∂K') of 0.0276 mm/mm². These values for the FIG. 7 rim are orders of magnitude larger than the maximum values in Tables 3-9. As can be seen, the maximum rate of change of curvature (∂K) for the FIG. 7 rim is at least almost four (4) times larger than the rims of Tables 3-9 and the maximum gradient derivative (∂K') is at least almost ten (10) times larger than the rims of Tables 3-9. To put it another way, the rims according to the present invention have a maximum rate of change of curvature (∂K) of less than 0.045 mm/mm, and more preferably about at most 0.020 mm/mm and still more preferably about at most 0.0120 mm/mm, and still yet more preferably about at most 0.0113 mm/mm. Alternatively or additionally, the rims according to the present invention have a maximum rate of change in the rate of change of curvature or gradient derivative (∂K') less than 0.0276 mm/mm², and more preferably, about at most 0.0100 mm/mm², and still more preferably about at most 0.004 mm/mm², and still yet more preferably about at most 0.0030 mm/mm².

Moreover, it is contemplated that these maximum values can differ depending on the size of the rim (see, Tables 3-9). For example, a 35 mm rim according to the present invention has a maximum rate of change of curvature (∂K) of about at most 0.0057 mm/mm and a maximum rate of change in the rate of change of curvature or gradient derivative (∂K') of about no more than 0.0008 mm/mm². A 45 mm rim according to the present invention has a maximum rate of change of curvature (∂K) of about at most 0.0066 mm/mm and a maximum rate of change in the rate of change of curvature or gradient derivative (∂K') of about at most 0.0022 mm/mm². A 60 mm rim according to the present invention has a maximum rate of change of curvature (∂K) of about at most 0.0087 mm/mm and a maximum rate of change in the rate of change of curvature or gradient derivative (∂K') of about at most 0.0015 mm/mm². A 70 mm rim according to the present invention has a maximum rate of change of curvature (∂K) of about at most 0.0084 mm/mm and a maximum rate of change in the rate of change of curvature or gradient derivative (∂K') of about at most 0.0012 mm/mm². An 85 mm rim according to the present invention has a maximum rate of change of curvature (∂K) of about at most 0.0113 mm/mm and a maximum rate of change in the rate of change of curvature or gradient derivative (∂K') of about at most 0.0015 mm/mm². A 90 mm rim according to the present invention has a maximum rate of change of curvature (∂K) of about at most 0.0120 mm/mm and a maximum rate of change in the rate of change of curvature or gradient derivative (∂K') of about at most 0.0030 mm/mm².

The above tables assist in describing another example embodiment, for example those results shown in FIG. 9. As shown, the turbulent boundary layer created by the optimum properties defined above for the present invention remains adhered to the surface of the wheel better than in the prior art wheels and keeps the boundary layer from separating from the air engaging side surfaces longer than the more laminar boundary layer of the air that occurs with the prior art, surface feature wheels. This also results in less interference drag between the air flowing past the wheel and the bicycle frame members such as the seat stays, chain stays, and the front wheel for blades.

This reduction in drag allows the wheel to slip through the air with less resistance, which enables the rider to either ride more quickly with the same amount of effort, or alternately to ride at the same speed with less effort, when compared to riding a bicycle with the prior art wheels. Furthermore, the resultant wheels provide for a quiet, stable, smoother, faster and crosswind balanced ride over the prior art rims.

The graph in FIG. 9 shows the actual results obtained in wind tunnel tests for wheels of the present invention versus several different prior art types of wheels. As shown, the wheel of the present invention creates a lower drag force than any of the other wheel types across most of the range of the graph, particularly between angles of 10 to 12 degrees. This can be attributed to lower surface friction of the windward side and better adhesion of the airflow o the leeward side of the wheel due to the continual rate of change of curvature and other optimizations noted above.

For example, FIGS. 12A, 12B, and 12C illustrate three different profile views with dimensions as described herein. In one embodiment shown therein, the front wheel has a larger leading edge width than the rear wheel. Applicant found that because the rear wheel sits behind the frame seat tube, a wider rim does not necessarily help flow attachment in higher crosswinds. In fact, the wider rim has a bigger adverse effect on frame drag than the front primarily due to the fact there are effectively two forks (seat stay and chain stay). In contrast, smaller width rims (e.g., about 24 mm widths) perform terribly when mounted on the front of the bicycle, but wider rims do perform better compared to those mounted in the rear. As such, embodiments described herein further optimize airflow around the entire bicycle structure by providing wheel sets with wider front wheel and narrower rear wheel assemblies.

Also shown in FIG. 12C, a shallow 35 mm rim does not allow enough length to achieve a large radius of curvature, so the max radius is only 150 mm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An article of manufacture, comprising:
  a bicycle rim having
    a leading edge where the bicycle rim is configured to engage a tire, wherein the leading edge is located at the radial outer periphery of the bicycle rim,
    a spoke face from where one or more spokes extend from the bicycle rim,
    a sidewall extending from the spoke face to the leading edge,
    the spoke face and the sidewall having a rate of change of curvature that is continuous, and
    wherein the sidewall from the spoke face to the leading edge has
      a maximum rate of change of curvature less than 0.045 mm/mm, and
      a maximum rate of change in the rate of change of curvature less than 0.0276 mm/mm².

2. The article of manufacture as in claim 1, wherein the rate of change of curvature is evenly distributed along the spoke face.

3. The article of manufacture as in claim 1, wherein a radius at any point along the spoke face is greater than 6 mm and the rate of change of curvature along the spoke face is less than 85 mm per linear mm.

4. The article of manufacture as in claim 1, wherein a radius at any point along the spoke face has a lower limit not greater than 15 mm.

5. The article of manufacture as in claim 1, wherein the spoke face has a length between 51 mm and 60 mm.

6. The article of manufacture as in claim 1, wherein the bicycle rim is a 35 mm style rim having a maximum radius of curvature of 150 mm along the spoke face and the sidewall.

7. The article of manufacture as in claim 1, wherein the bicycle rim has a radius of curvature of less than or equal to 420 mm along the spoke face and the sidewall.

8. The article of manufacture as in claim 1, wherein the bicycle rim at the leading edge has a width of 23 mm to 27 mm.

9. The article of manufacture as in claim 1, wherein the bicycle rim at the leading edge has a width between 24 mm to 26 mm.

10. The article of manufacture as in claim 1, wherein:
  a chord distance as measured from the leading edge to an end of the spoke face defines an overall rim depth for the bicycle rim; and
  the bicycle rim has a maximum width located at approximately 40% or less of the overall rim depth as measured from the leading edge.

11. The article of manufacture as in claim 10, wherein the maximum width is approximately 0.75 mm wider than the width of the bicycle rim at the leading edge.

12. The article of manufacture as in claim 1, further comprising:
  the bicycle rim having a braking surface located between the leading edge and the sidewall;
  the braking surface and the sidewall defining a camber angle; and
  the camber angle being greater than 175° and less than 178°.

13. The article of manufacture as in claim 12, wherein the camber angle is at least 177.5° and at most 177.8°.

14. The article of manufacture as in claim 1, further comprising:
  the bicycle rim at the leading edge having a width between 24 mm to 26 mm;

the bicycle rim having a maximum width located at approximately 40% or less of the overall rim depth as measured from the leading edge;

the bicycle rim having a braking surface located between the leading edge and the sidewall;

the braking surface and the sidewall defining a camber angle; and the camber angle being greater than 175° and less than 178°.

15. The article of manufacture as in claim 1, further comprising:

a tire coupled to the rim at the leading edge; and wherein the tire and rim form a bidirectional airfoil with reversible leading edges.

16. The article of manufacture as in claim 1, further comprising:

the spokes;

a hub connected to the spokes; and the spoke face having spoke holes from which the spokes extend to the hub.

17. A bicycle incorporating the bicycle rim as in claim 1.

18. A bicycle rim, comprising:

a pair of opposing sidewalls that extend rearward from a leading edge of the rim where a tire generally seats;

a spoke face oriented to have a cross-sectional shape, wherein the cross-sectional shape begins at a maximum value point where the rate of change of curvature for the opposing sidewalls changes and wherein the cross-sectional shape includes a continuous rate of change of curvature over the entire spoke face for improving wheel performance across a wide degree of yaw angles in a crosswind environment;

wherein curves along the sidewalls from the spoke face to a radial outer periphery of the leading edge have positional continuity (G0), tangential continuity (G1), curvature continuity (G2), and curvature acceleration continuity (G3);

wherein the positional continuity (G0) requires the curves touch;

wherein the tangential continuity (G1) requires the curves to share a common tangent direction where the curves touch;

wherein the curvature continuity (G2) requires the curves to share a common curvature where the curves touch; and wherein the curvature acceleration continuity (G3) requires the curvature to accelerate at a common rate where the curves touch.

19. The bicycle rim of claim 18, the continuous rate of change of curvature is less than 50 mm per linear mm.

20. A bicycle rim, comprising:

a curved tire base for seating a tire to the rim, wherein the tire when attached acts as a first leading edge of a virtual double leading edged airfoil when a front cross section of rim leads a direction of travel for the bicycle;

a spoke hole face with a surface area defined across a first trailing edge of the virtual double leading edge airfoil when the tire acts as the first leading edge, wherein the surface of the spoke hole face includes a minimum radius above a predefined threshold at a point of total rim depth with an increasing radius extending backwards from the minimum radius point to a sidewall surfaces of substantially uniform radius, thereby providing a rim with a continuous curvature; and wherein the sidewall from the spoke hole face to the first leading edge has a maximum rate of change of curvature less than 0.045 mm/mm, and a maximum rate of change in the rate of change of curvature less than 0.0276 mm/mm².

21. A method of designing a bicycle rim, comprising:

setting a leading edge width based on performance and a total depth of the rim based on a length of sidewall and leading edge length;

defining a maximum width of the rim based on a percentage of chord depth and predefined camber angle; and defining the shape of a spoke hole face based on a rectangle defined by the maximum width and depth of the rim, wherein the spoke hole face includes a radius in order to reduce flow separation at a leading edge and a minimum rate of change of curvature based on the defined rectangle; and setting the sidewall from the spoke hole face to a radial outer periphery of the leading edge to have a maximum rate of change of curvature less than 0.045 mm/mm, and a maximum rate of change in the rate of change of curvature less than 0.0276 mm/mm².

22. The method as in claim 21, wherein said leading edge width does not exceed 26 mm.

23. The method as in claim 22, wherein said leading edge width is 25 mm.

24. The method as in claim 21, wherein the percent of chord depth is less than 40%; and a camber angle of the bicycle rim is greater than 175° and less than 178°.

25. The method as in claim 21, wherein the radius is greater than 6 mm and less than 15 mm.

26. The method as in claim 25, wherein the bicycle rim is incorporated into a rear wheel of a bicycle and designed to facilitate airflow around a frame and the rear wheel of the bicycle.

27. The method as claim 21, wherein the rate of change of curvature cannot exceed 85 mm/linear mm.

28. The bicycle rim as in claim 1, wherein rate of change of curvature is represented by the following equation:

$$\partial K = \frac{(K_2 - K_1)}{L}$$

where:

$\partial K$=Rate of change of curvature or gradient;

$K_1$=Curvature at a first measurement point ($P_1$);

$K_2$=Curvature at a second measurement point ($P_2$); and

L=Curvilinear distance between the first and second measurement points ($P_1$ and $P_2$).

29. The bicycle rim as in claim 28, wherein the curvilinear distance (L) is at most 3 mm between measurement points.

30. The bicycle rim as in claim 1, wherein the maximum rate of change of curvature is less than 0.045 mm/mm.

31. The bicycle rim as in claim 1, wherein the maximum rate of change of curvature is at most 0.020 mm/mm.

32. The bicycle rim as in claim 1, wherein the maximum rate of change of curvature is at most 0.0120 mm/mm.

33. The bicycle rim as in claim 1, wherein the maximum rate of change of curvature is at most 0.0113 mm/mm.

34. The bicycle rim as in claim 1, wherein the maximum rate of change in the rate of change of curvature is less than 0.0276 mm/mm².

35. The bicycle rim as in claim 1, wherein the maximum rate of change in the rate of change of curvature is at most 0.0100 mm/mm².

36. The bicycle rim as in claim 1, wherein the maximum rate of change in the rate of change of curvature is at most 0.0040 mm/mm².

37. The bicycle rim as in claim 1, wherein the maximum rate of change in the rate of change of curvature is at most 0.0030 mm/mm².

38. The bicycle rim as in claim 1, wherein the bicycle rim is a 35 mm rim with a maximum rate of change of curvature of at most 0.0057 mm/mm and a maximum rate of change in the rate of change of curvature of no more than 0.0008 mm/mm².

39. The bicycle rim as in claim 1, wherein the bicycle rim is a 45 mm rim with a maximum rate of change of curvature of at most 0.0066 mm/mm and a maximum rate of change in the rate of change of curvature of at most 0.0022 mm/mm².

40. The bicycle rim as in claim 1, wherein the bicycle rim is a 60 mm rim with a maximum rate of change of curvature of at most 0.0087 mm/mm and a maximum rate of change in the rate of change of curvature of at most 0.0015 mm/mm².

41. The bicycle rim as in claim 1, wherein the bicycle rim is a 70 mm rim with a maximum rate of change of curvature of at most 0.0084 mm/mm and a maximum rate of change in the rate of change of curvature of at most 0.0012 mm/mm².

42. The bicycle rim as in claim 1, wherein the bicycle rim is an 85 mm rim with a maximum rate of change of curvature of at most 0.0113 mm/mm and a maximum rate of change in the rate of change of curvature of at most 0.0015 mm/mm².

43. The bicycle rim as in claim 1, wherein the bicycle rim is a 90 mm rim with a maximum rate of change of curvature of at most 0.0120 mm/mm and a maximum rate of change in the rate of change of curvature of at most 0.0030 mm/mm².

44. The bicycle rim as in claim 1, wherein all curves along the sidewall and the spoke face have curvature acceleration continuity (G3) in which common curvature accelerates at a common rate where the curves touch.

45. The bicycle rim as in claim 1, wherein the radius of curvature reduces from the sidewall to the center of the spoke face.

46. The bicycle rim as in claim 1, wherein the bicycle rim has a maximum width located at approximately 40% or less of the overall rim depth as measured from the leading edge.

47. The bicycle rim as in claim 1, wherein the bicycle rim has a maximum width located at approximately 30% or less of the overall rim depth as measured from the leading edge.

48. The article of manufacture of claim 1, wherein all curves along the sidewall from the spoke face to a radial outer periphery of the leading edge have:
   positional continuity (G0) where the curves touch;
   tangential continuity (G1) in which the curves to share a common tangent direction where the curves touch;
   curvature continuity (G2) in which the curves to share a common curvature where the curves touch; and
   curvature acceleration continuity (G3) in which the common curvature accelerates at a common rate where the curves touch.

49. The article of manufacture of claim 1, wherein all of the sidewall is curved.

50. The article of manufacture of claim 1, wherein the sidewall lacks a flat section.

51. The article of manufacture of claim 1, wherein the sidewall has a maximum radius of curvature that is at most 443 mm.

52. An article of manufacture, comprising:
   a bicycle rim having
      a leading edge where the bicycle rim is configured to engage a tire, wherein the leading edge is located at the radial outer periphery of the bicycle rim,
      a spoke face from where one or more spokes extend from the bicycle rim, and
      a sidewall extending from the spoke face to the leading edge, wherein all curves along the sidewall have
         positional continuity (G0) where the curves touch,
         tangential continuity (G1) in which the curves to share a common tangent direction where the curves touch,
         curvature continuity (G2) in which the curves to share a common curvature where the curves touch, and
         curvature acceleration continuity (G3) in which the common curvature accelerates at a common rate where the curves touch.

53. The article of manufacture of claim 52, wherein the sidewall has:
   a maximum rate of change of curvature less than 0.045 mm/mm; and
   a maximum rate of change in the rate of change of curvature less than 0.0276 mm/mm².

* * * * *

UNITED STATES PATENT AND TRADEMARK OFFICE
CERTIFICATE OF CORRECTION

| | |
|---|---|
| PATENT NO. | : 8,757,733 B2 |
| APPLICATION NO. | : 13/633629 |
| DATED | : June 24, 2014 |
| INVENTOR(S) | : Simon Smart |

It is certified that error appears in the above-identified patent and that said Letters Patent is hereby corrected as shown below:

In the Specification

Col. 6, line 21, replace "min" with --mm--

Signed and Sealed this
Ninth Day of September, 2014

Michelle K. Lee
*Deputy Director of the United States Patent and Trademark Office*